Dec. 14, 1965 D. N. OBENSHAIN 3,222,964

METHOD OF SHEETING WEBS

Original Filed Oct. 9, 1962 24 Sheets-Sheet 1

INVENTOR.
DAVID NOEL OBENSHAIN
Richard L. Schmalz
Agent

INVENTOR.
DAVID NOEL OBENSHAIN

METHOD OF SHEETING WEBS

Original Filed Oct. 9, 1962 24 Sheets-Sheet 3

INVENTOR.
DAVID NOEL OBENSHAIN

METHOD OF SHEETING WEBS

Original Filed Oct. 9, 1962 24 Sheets-Sheet 4

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 5

FIG. 5 TRANSFER DRUM

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 6

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 7

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 8

*INVENTOR.*
DAVID NOEL OBENSHAIN

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 10

INVENTOR.
DAVID NOEL OBENSHAIN

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 12

INVENTOR.
DAVID NOEL OBENSHAIN

INVENTOR.
DAVID NOEL OBENSHAIN

*INVENTOR.*
DAVID NOEL OBENSHAIN

INVENTOR.
DAVID NOEL OBENSHAIN

INVENTOR
DAVID NOEL OBENSHAIN

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 18

INVENTOR
DAVID NOEL OBENSHAIN

INVENTOR.
DAVID NOEL OBENSHAIN

Dec. 14, 1965 D. N. OBENSHAIN 3,222,964

METHOD OF SHEETING WEBS

Original Filed Oct. 9, 1962 24 Sheets-Sheet 23

INVENTOR.
DAVID N. OBENSHAIN

INVENTOR.
DAVID N. OBENSHAIN 3,222,964
METHOD OF SHEETING WEBS

David Noel Obenshain, Luke, Md., assignor to West Virginia Pulp and Paper Company, New York, N.Y., a corporation of Delaware
Original application Oct. 9, 1962, Ser. No. 230,790. Divided and this application Mar. 6, 1964, Ser. No. 349,971
13 Claims. (Cl. 83—26)

The present application is a division of my copending application, Serial No. 230,790, filed October 9, 1962, for "Single Web Sheet Cutter and Stacker," now U.S. Patent 3,203,326.

This invention relates to a method of sheeting a traveling web and, more particularly, it relates to a method of inspecting, cutting, sorting, and delivering sheets of paper and the like.

In conventional sheeting operations at a paper mill, webs from a plurality of rolls are combined and directed through a sheet cutting machine at relatively low speed, in the order of 150 to 300 feet per minute. The sheets are cut approximately one inch oversize in each dimension to allow for a guillotine trimming operation which follows. In between the cutting and trimming operations, the sheets are manually handled for ocular inspection, sorting and counting. Substantially more paper than required to fill the customer's order must be cut to assure an adequate allowance for loss due to inspection and sorting. Since the amount of paper that will be rejected in the sorting operation is never known in advance, frequent over-runs or under-runs of cut paper occur. The over-runs of course end up as storage problems or "broke"; the under-runs as delays in deliveries and in scheduling problems. The trim losses often amount to 10% or more of the original good paper. A great amount of floor space is required for the inspection and sorting, and intermediate storage. Much manual labor is required, largely of a heavy, tedious and/or repetitive nature.

The finished stacks of paper contain repeating sequences of individual sheets from a number of different rolls of paper, and this gives sheet to sheet differences in color, finish, ink receptivity and other characteristics that affect printability of the paper. The printing press operator can adjust his press to print any one of the sheets well, but not all of them well with one press setting.

While single web cutting on conventional equipment is entirely possible, the low rate to which the advance of the cut sheets for stacking must be limited makes the operation generally uneconomical. Stacking velocities of 250 feet per minute are about the maximum that most papers will stand without having the leading edges damaged by the impact of the sheets against paper stops.

The edge slitting and cutting of multiple webs in the conventional cutter produce a quantity of paper dust due to cutting through the combined thickness of the multiple webs. The dust gets between the sheet and is almost impossible to remove. This dust creates a very serious problem in printing plants, filling up and often damaging the printing plates, and causing printing results of inferior quality.

In multiple web cutting, on even the best available equipment, due to the thickness of the cut and to slippage between webs, the cut sheets will vary in size and squareness beyond the allowable tolerances. This makes necessary the guillotine trimming operation, with its extra equipment, labor and trim losses.

It is quite obvious that multiple web cutting virtually precludes automatic inspection and sorting of the cut sheets as a continuous part of the sheeting operation.

My invention overcomes all the above mentioned difficulties of conventional sheeting operations by novel means which I shall now proceed to describe.

Other objects and advantages will hereinafter appear.

To aid in understanding my invention, and as part of this specification, the following drawings of certain practical and advantageous illustrative embodiments are included, in which, FIGURE 1 is a comprehensive, purely diagrammatic view of the preferred embodiment of my invention;

FIGURE 25A is a diagram of the arrangement of one set of switches in the timer.

FIGURE 25B is a diagram of a second set of switches in the timer.

GENERAL DESCRIPTION AND OPERATION

Figure 1:
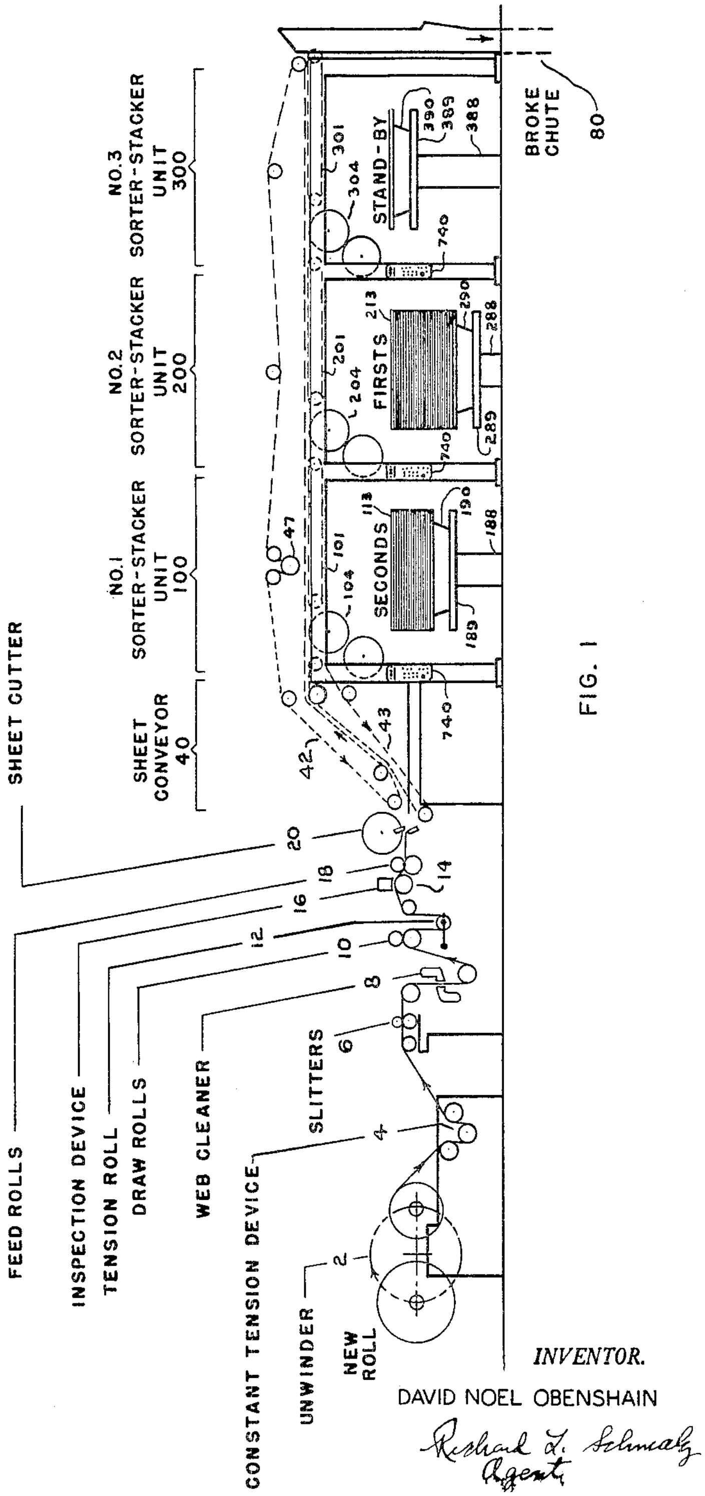

In the preferred embodiment of my invention as shown in FIGURE 1, a roll of paper is placed in the unwinder 2 with the web therefrom moving at high speed through a constant tension device 4, through slitters 6 where it may be edge trimmed and/or slit as required, past web cleaner 8, through draw rolls 10, around tension roll 12, over inspection roll 14 where it is viewed by inspection device 16, through feed rolls 18 and to rotary sheet cutter unit 20 where it is cut into sheets. Each sheet then travels up inclined sheet conveyor 40 to the No. 1 sorter-stacker unit 100.

As illustrated, No. 1 sorter-stacker unit 100 is stacking sheets classified as "seconds." No. 2 sorter-stacker unit 200 is stacking "firsts." No. 3 sorter-stacker unit 300 is in stand-by condition, ready to accept delivery of "firsts" or "seconds" as may be required due to completion of a stack in either of the other two sorter-stacker units. Any of the three sorter-stacker units can be programmed to receive "firsts" or "seconds," or be put in stand-by condition.

If the sheet approaching No. 1 sorter-stacker unit 100 is a "first" as determined by the inspection device 16, it will by-pass the No. 1 sorter-stacker unit 100 and be picked off the sheet conveyor at the No. 2 sorter-stacker unit 200 where it will be slowed down and delivered onto the "firsts" stack of sheets. If the sheet had been a "second," it would have been picked off the sheet conveyor at the No. 1 sorter-stacker unit 100. If the sheet had been classified as a "reject," it would have by-passed all the sorter-stacker units and would have been delivered into the broke chute 80.

Paper speeds up to 1000 feet per minute or more at the unwinder may be attained. However, final speed of sheets as they are delivered onto any of the stacks is always appreciably less than 250 feet per minute. Means for slowing the sheets at delivery to the stacks, together with means for high speed sheet sorting, form the major part of this invention and will be described in full detail later herein.

Conventional equipment up to and including the sheet cutter unit 20 may be readily obtained from manufacturers of paper making and converting equipment. While I illustrate and prefer a turret type unwinder with flying paster of the kind sold by Black Clawson Co., Dilts Machine Works Division, and described as example 13 of part II of a brochure entitled, "Continuous Unwinding Equipment," by Robert J. Jacobs of the Company referred to, due to its ability to put on a new roll of paper without stopping the operation, other simpler types of conventional unwinders can be used.

The length of sheet cut depends on the length of web fed during a cutting cycle of a conventional flying cutter 20. A common driver is provided for the cutter drum and for the web feeding means. The cutter drum is positively driven from the common driver in fixed relation thereto, while a manually settable change speed transmission unit is interposed between the common driver and the web feeding means, for causing any chosen one of a wide variety of selected lengths to be consistently and precisely fed out and cut. The change speed unit 415 is desirably a positive change gear unit of the type disclosed and claimed in my U.S. Patent 3,128,662. The change gear unit employed in the present illustrative machine is adapted to provide sheets from about 24 to 49 inches in length at uniform intervals of one-sixteenth inch.

The illustrative inspection device 16, capable of giving multiple quality classifications, has been developed by the Radio Corporation of America, Camden, New Jersey, and is not per se a part of this invention. The device is identified by the manufacturer as "Optical Paper Inspection Equipment," Catalogue No. E–4350. Inspection equipment of other manufacture is currently available and may be used in the same general location and for similar purposes. For the purpose of the present disclosure it is sufficient that an inspection mechanism is provided which scans the web, develops a predetermined signal voltage if the sheet length is of "seconds" quality, and a greater predetermined signal voltage if the sheet length is of "rejects" quality, producing a "seconds" signal in the first instance, and both "seconds" and "rejects" signals in the second instance.

The number of sorter-stacker units used depends on the production requirements of the installation. Three sorter-stacker units make up the preferred system. This permits stacking two different classifications of sheets and having an extra sorter-stacker unit in stand-by condition so that a unit containing a finished stack can be withdrawn from service and a fresh unit substituted, without loss of operating time on the machine. Together with the flying splice unwinder, this permits 100% running time except for paper breaks or other malfunctions, maintenance and resetting pursuant to changes of output requirements.

Where automatic inspection and sorting is not required but high speed single web sheeting is desired, a simplified single stacker unit, similar to the sorter-stacker unit 100, but without the sorting feature, may be used. Detailed description of this will be given later. Such a unit could also be readily adapted to stack sheets from high speed, web fed printing presses.

SHEET CONVEYOR

Sheets leaving the sheet cutter unit 20 are picked up and transported by the inclined sheet conveyor 40 to the first sorter-stacker unit 100. This conveyor is inclined rather than level, so that the equipment up to and including the cutter may be mounted at floor level. The sorter-stacker units should be elevated enough to permit building the required height stacks of paper to meet the customer's specifications. Obviously, many variations in elevations of the various units may be employed, even to the extent of having two or more operating floor levels. For most installations the arrangement as shown in FIGURES 1 and 2 will be found preferable.

Figure 2:
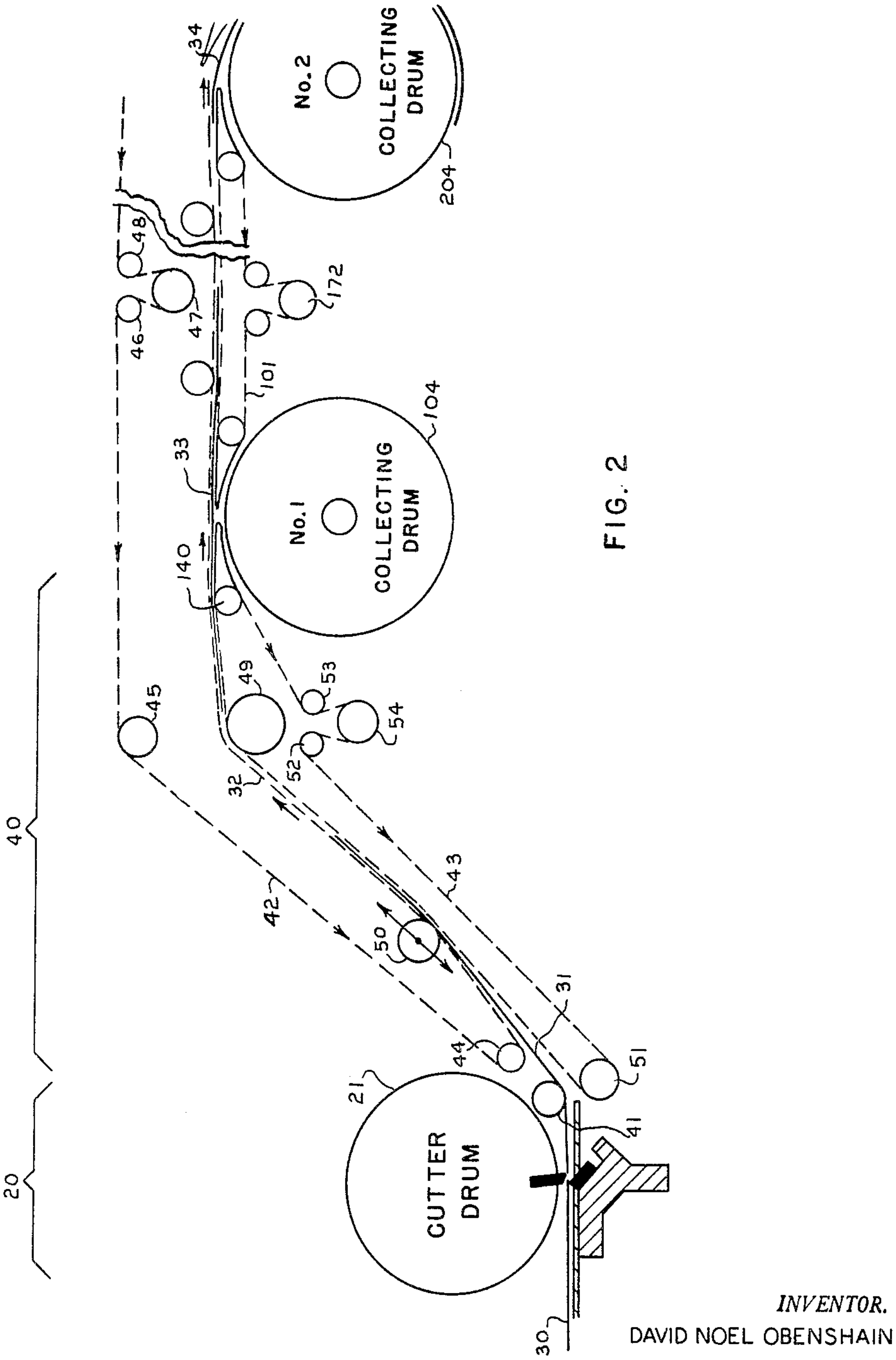
FIGURE 2 is a fragmentary diagrammatic view in sectional, side elevation, showing in some detail the sheet transport system from the sheet cutter to the second sorter-stacker unit.

A larger scale view of the inclined sheet conveyor and associated equipment is shown in FIGURE 2. Web 30 coming to the cutter drum 21 is shown cut into sheets 32, 33 and 34 which are shown disposed at various locations between top tapes 42 and bottom tapes 43. The top tapes 42 consist of a set of ¾ inch wide by .050 inch thick plastic belts spaced on 2¾ inch centers and sufficient in number to extend slightly beyond the edges of the widest sheets which the machine is capable of handling. Dimensions given herein are strictly for purposes of illustration and are not to be interpreted as limitations. It will be seen that this set of tapes is carried on rolls 44, 45, 46, 47, 48, 49, 50 and others not shown in this view. Roll 47 is the drive roll for this set of tapes.

Bottom tapes 43 are similar in structure and spacing to the top tapes and lie directly beneath the top tapes. The bottom tapes are carried on rolls 49, 51, 52, 53, 54 and pulleys 140. Roll 54 is the driver for this set of tapes and is driven in a manner similar to rolls 47, 172, and 272 (FIG. 3) as will be described later.

For guiding and maintaining the spacings of the tapes, rolls 44, 45, 48, 49, 51, 53 and pulleys 140 are slightly crowned at the positions where the tapes contact them.

Roll 50 is so disposed that it causes tapes 42 to contact tapes 43 and exert a slight pressure upon them. This forms a nip between the tapes causing a gripping action on a sheet just before it is cut loose from the web by cutter drum 21. Roll 50 is adjustable in the direction of the arrows passing through it. It is normally positioned to cause gripping of the sheet slightly before the sheet is severed from the web. The tapes always run faster than the paper web, as will be explained later, and hence the sheets are quickly accelerated to tape speed as soon as they are cut. This also accounts for the spacing between sheets 32, 33 and 34 as shown.

Top tapes 42 extend for the full length of the machine as shown in FIGURE 1. Bottom tapes 43 only extend to the first collecting drum 104 as shown. Additional bottom tapes 101, 201 and 301 are provided between the collecting drums 104, 204 and 304, and the "rejects" chute 80 as shown in FIGURE 1.

All these tapes 42, 43, 101, 201 and 301 run at the surface speed of the collecting drums 104, 204 and 304.

A small roll 41 (FIG. 2), driven at tape speed, is located as close to cutter drum 21 as possible, to direct the sheets onto the sheet conveyor and to keep the paper traveling past the cutting point in a straight line.

SORTER-STACKER OPERATION

The three sorter-stacker units shown in FIGURE 1 are all substantially identical. For clarity, basic parts of the No. 1 sorter-stacker unit are identified by numbers in the series 100 to 199. Similar parts of the No. 2 sorter-stacker unit have corresponding numbers in the 200 to 299 series and similar parts of the No. 3 sorter-stacker unit have corresponding numbers in the 300 to 399 series.

The following brief explanation of the operation will be followed by more detailed descriptions of the various mechanisms used.

Figure 3:
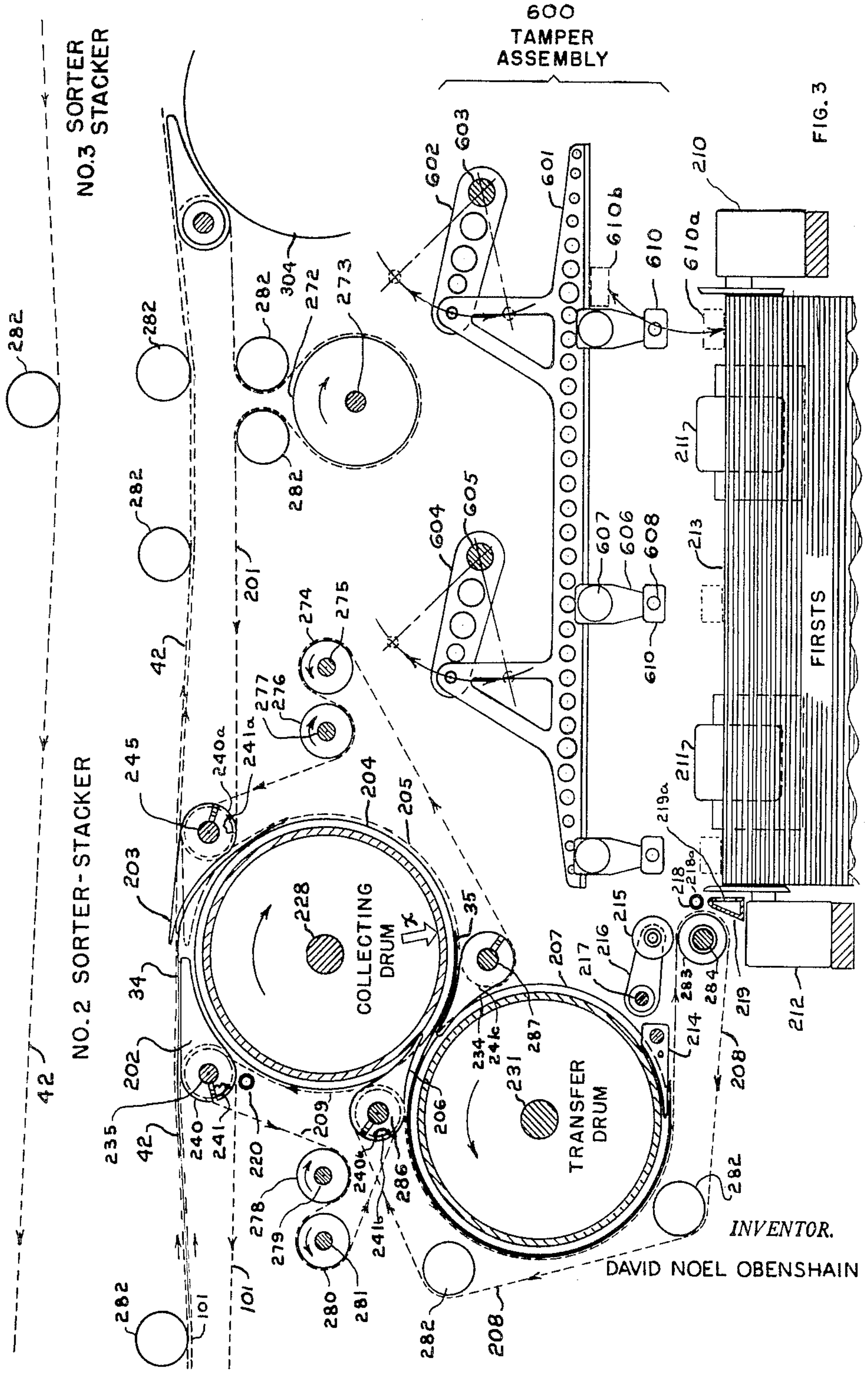
FIGURE 3 is a fragmentary view in sectional side elevation of a typical sorter-stacker unit.

As illustrated in FIGURES 1, 2 and 3 the No. 2 sorter-stacker unit is stacking sheets classified as "firsts." Sheet 34, a "firsts," is shown in FIGURE 3 as being transported by tapes 42 and 101 over guides 202 to sorting flipper 203 which is in the raised or accepting position. Sorting flipper 203 then directs the sheet on down and around collecting drum 204 where it is held in place on the drum by tapes 205 and transfer guides 234. This No. 2 sorter-stacker unit is typical of all the sorter-stacker units and is shown in detail in FIGURE 3. Sheet 34 is shown as having been fully accepted in FIGURE 2.

Transfer flipper 206 is shown in its up position in FIGURE 3, in the act of stripping a packet of five sheets 35 from the collecting drum 204 and directing it onto the transfer drum 207 where the packet is held in place by tapes 208. It will be noted that the trailing edge of the five sheet packet is in line with the arrow *x* shown on the collecting drum 204. This point *x* on the collecting drum 204 is the main indexing point used in timing all the operations of the sorter-stacker unit. It marks the point where the trailing edge of any length sheet will always fall. After originally synchronizing this point on the collecting drum 204 with the trailing edge of any normally delivered sheet, no further adjustment of the drum or its drive shaft will be required except upon reassembly of the machine after repairs, or maintenance on the machine drives.

Figure 17:
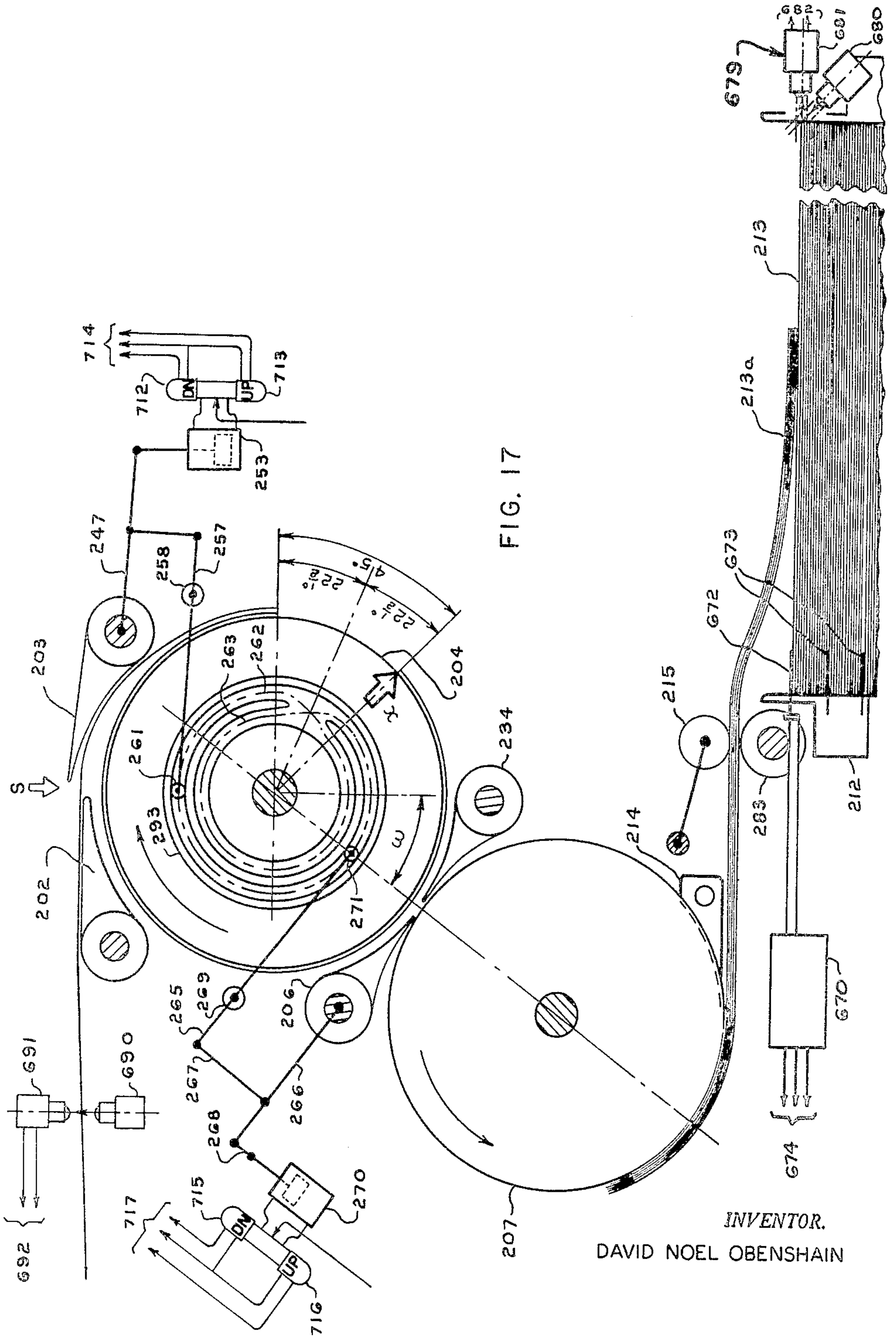
FIGURE 17 is a sectional view of a sorter-stacker unit of the preferred embodiment, showing in schematic form the operating mechanism for the sorting and transfer flippers, the sheet counting head, the ream flag inserter, and the stack level sensor.

As the collecting drum 204 rotates, the trailing edge of the five sheet packet leaves the collecting drum 204, and the transfer flipper 206 is moved back to collecting position, as shown in FIGURE 17, before the leading edge of sheet 34 reaches it. Thus sheet 34 is directed around the collecting drum 204 toward guides 202, and is held to the drum by tapes 209. Sheet 34 will then completely circle the collecting drum 204 and will continue to do so until removed by the transfer flippers 206. Assuming that sheet 33 which follows sheet 34 is a "first," it will be directed onto the collecting drum 204 and will be deposited directly on top of sheet 34 with edges in exact register. Some explanation as to why this will occur is in order. The cutter drum 21 and the collecting drums 104, 204 and 304 are positively connected together by means of the machine drive in one-to-one ratios, as will be shown in more detail later under the heading, "General Machine Drives." Thus when the cutter drum 21 makes one revolution, all the collecting drums 104, 204 and 304 will likewise make one revolution. As stated previously, the sheet transport tapes travel at the same speed as the surface speed of the collecting drums. Thus, these tapes will travel a distance equal to the circumference of a collecting drum for every revolution of the collecting drums and therefore, every revolution of the cutter drum 21. For the purpose of illustration, the circumference of each of the collecting drums 104, 204 and 304 is taken as 56 inches, and the sheet being cut is assumed to be 40 inches long. Illustratively, the axes of successive collecting drum shafts 128, 228, 328 are spaced apart by uniform intervals each equal to a drum circumference. This is a desirable but not an essential relationship.

The tapes 42, 43, 101, 201 and 301 travel 56 inches for every cut, causing the trailing edges of the sheets to be situated on the tapes at 56 inch intervals and with 16 inches between sheets. Therefore, since a trailing edge occurs every 56 inches, and 56 inches is the circumference of the collecting drums 104, 204 and 304, the trailing edges of sheets collected on a collecting drum will fall directly on top of each other. This will not be exactly true because the circumference of the collecting drum increases slightly with each sheet collected. However, for practical purposes the deviation due to this cause is so small as to be of no consequence. From the above data, it will be evident that the distance from the cutting point at the sheet cutter unit 20 to the point *x* on any collecting drum is necessarily an integral multiple of the circumference of the collecting drums.

The collecting drum 204 will collect only "firsts." If a "seconds" or a "rejects" sheet comes along, the sorting flipper 203 will move downwardly into the closed position indicated by the dotted lines in FIGURE 3, permitting the sheet to travel over and past sorting flipper 203 toward the next sorter-stacker unit.

When a fifth sheet comes onto the collecting drum 204, and just before it reaches the transfer flipper 206, such transfer flipper will be caused to move upward into stripping position as shown in FIGURE 3, and all five sheets will be stripped as a packet from collecting drum 204 and directed onto the transfer drum 207. During this transfer, both collecting drum 204 and transfer drum 207 will be rotating at exactly the same surface speed. As soon as the five sheet packet 35 is clear of the collecting drum 204, the transfer drum 207 starts slowing down and attains a minimum speed equal to about 15% of its original speed just as the leading edge of the five sheet packet 35 contacts back joggers 210. The transfer drum 207 is then accelerated to the speed of the collecting drum 204, ready to accept another five sheet packet as soon as it has been collected.

Enroute from the transfer drum 207 to the stack 213, the sheets, transported by tapes 208, are stripped from transfer drum 207 by means of strippers 214, and pass under rubber rollers 215 and over an air pipe 218. As the sheets settle down on the stack, the joggers 210, 211 and 212, assisted by air jet conduit 219, move the sheets into exact registry with the sheets already on the stack.

For some grades and sizes of sheets, tamper 600 is automatically lowered onto the stack at intervals, to compress the stack and remove excess air from between the sheets. This tamper mechanism is described in more detail later under the heading "Stacker Details." For very heavy papers and light paperboards the tamper may be omitted or temporarily rendered inoperative.

Five has been chosen as the number of sheets to complete a packet on a collecting drum for several reasons. In the first place, the collection of five sheets affords ample time for the slow-down-speed-up cycle of the associated transfer drum. Secondly, the five sheets, compressed by the tapes into a firm packet, have sufficient body and stiffness to cause them to be carried across the stack without crumpling. A third reason is that five is an aliquot part of a ream of 500 sheets, and thus simplifies ream counting and the insertion of ream marker flags. For very light papers, the collection of 10 or more sheets may be found to be preferable. Modifications of the control system can be contrived to collect any reasonable, desired number of sheets.

The angular relation between the collecting drum and the transfer drum (W in FIGURE 17) is arbitrarily selected. I find 36 degrees to be a satisfactory value. Less than 36 degrees makes the unit greater in length and height; more than 36 degrees tends to make the wrap of tapes 209 (FIGURE 3) around the collecting drum rather short.

An air pipe 220, (FIGURE 3), has ⅛ inch holes positioned between each pair of successive guides 202, and directed toward the top of the collecting drum. The air from this pipe causes the sheets to smoothly follow the contour of the bottom of the sorting flippers 203 until engaged by tapes 205. Otherwise, the sheets tend to flutter and wrinkle at this point.

COLLECTING DRUMS

Figure 4:
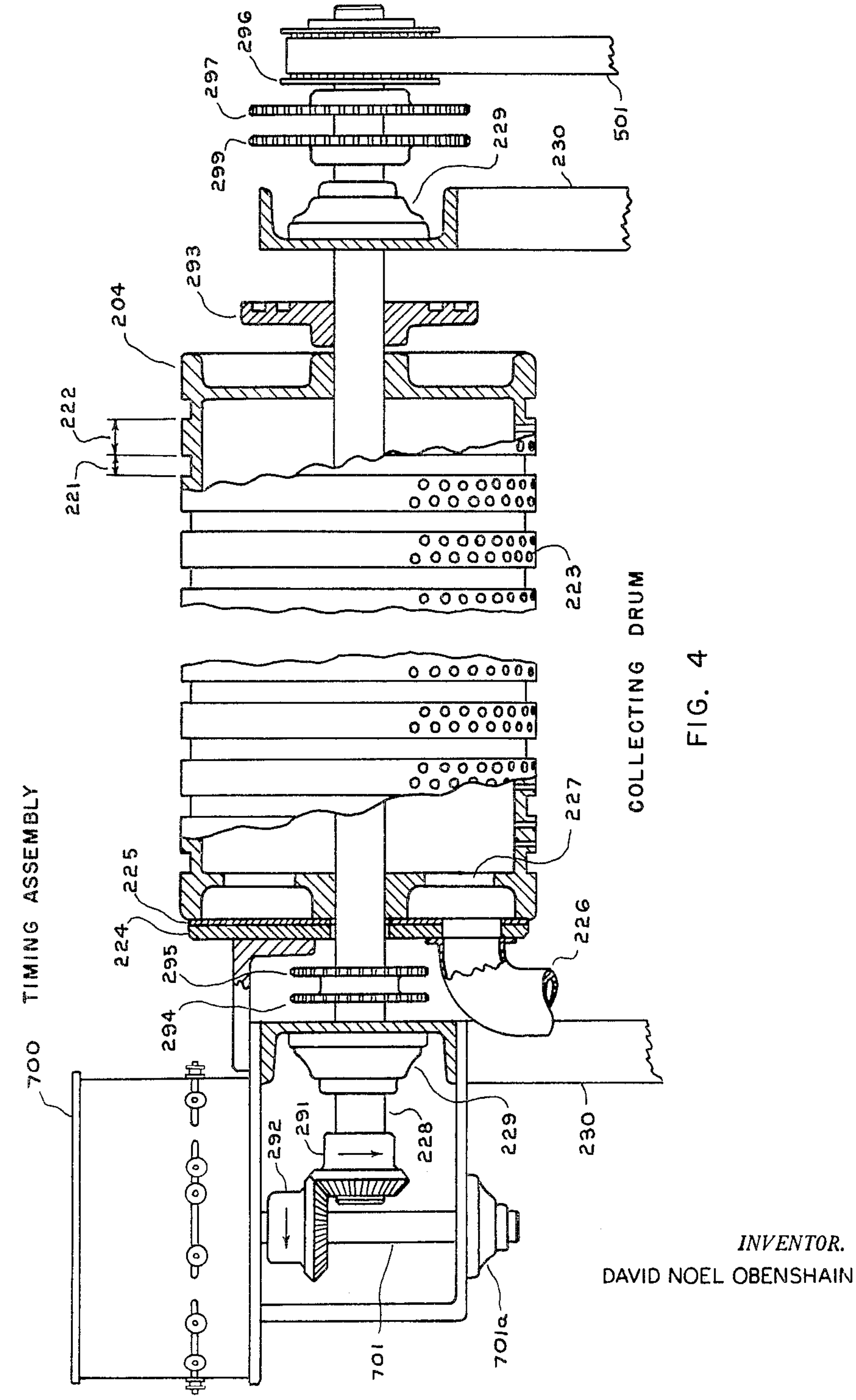
FIGURE 4 is a fragmentary view, partly broken away, of a collecting drum and associated mechanism.

A partial cross section and assembly of a collecting drum 204 is given in FIGURE 4. The collecting drum must have a circumference greater than the length of the longest sheet to be handled, preferably at least 10 to 15% greater. This is necessary in order to provide a gap between the two ends of the sheet, or packet of sheets, so that the tips of the transfer flipper 206 (FIGURE 3) can get in and out of the collecting drum grooves 221 without contacting or damaging the sheets. This gap is also necessary between sheets on the transporting tapes to permit operation of the sorting flippers 203. In the mechanism as illustarted herein, the gap is necessarily at least one-eighth of the drum circumference or 45°. This allows for a maximum sheet length of 49 inches, and the minimum gap amounts to one-seventh of the maximum sheet length.

The collecting drum may be constructed as a casting, as a weldment, or formed of reinforced plastic, or fabricated by other means. A series of grooves 221 approximately 1 inch wide by one-half inch deep are formed in the face of the drum. The lands 222 between the grooves are one and three-quarter inches wide. As mentioned previously, where dimensions are given, they are for purposes of illustration and are not to be interpreted as limitations. The grooves permit the tips of the transfer flippers 206 to enter and strip the sheets from the drum.

A series of $\frac{3}{16}$ inch holes 223 arranged as shown are provided for holding the leading edge of the first sheet collected to the collecting drum by vacuum. Vacuum is supplied to the inside of the drum through stationary vacuum plate 224, faced with wear plate 225 and connected to a source of vacuum by duct 226. Holes 227 in the end web of the drum give access for the vacuum to the inside of the drum. Holes 223 do not extend the full circumference of the drum, but are limited to such area that they can hold the leading margin, at least, of any length sheet for which the machine is designed. The vacuum required inside the drum is in the order of $\frac{1}{16}$ inch as measured by a water column manometer. This measurement is with all holes open; that is, not covered by paper or tapes. When covered by paper the vacuum rises to ¼ inch of water.

The use of vacuum at the collecting drum is preferred in order to insure a tight hold on the leading edge of the first sheet collected on the collecting drum. Without vacuum, the leading edge of this sheet, when passing the transfer guides and flippers may lift off slightly causing the sheet to creep slightly backwards on the drum every revolution. In case a single sheet has to be held on the drum for a number of revolutions, as can happen due to sorting, the sheet if allowed to slip would get completely out of register and could cause a jam-up at the transfer flippers when a transfer is made. All sheets after and including the first sheet tend to adhere to one another as a result of having the air squeezed out from between them by the tapes around the collecting drum. The air trapped in the grooves in the collecting drum tends to prevent adequate adherence of the first sheet to the collecting drum. Mechanical gripper fingers for this purpose could be used, but I find the vacuum to be simpler.

Collecting drum 204 (see FIGURE 4) is mounted on shaft 228 by means of keys and set screws (not shown). Synchronizing adjustment of the drum can only be effected by adjustment of the drum shaft relative to the shaft drive. The shaft is supported by means of bearings 229 on frames 230. On the left outboard end of shaft 228 is rigidly mounted a miter gear 291 which engages a miter gear 292 on a shaft 701 of a timing assembly 700, which will be described later under the heading, "Control System." Inboard at the same end are mounted by key and set screws (not shown) sprockets 294 and 295 which drive the tape driving rolls, which drives will also be shown in detail later under the heading, "Tape Systems and Drives". Inboard at the right end of the shaft is mounted by key and set screws (not shown) timing cam 293. The action of this cam will be described later. Outboard at this end on shaft 228 are mounted by keys and set screws (not shown) sprockets 297 and 299, and timing belt pulley 296. Sprockets 297 and 299 are the main drives to the collecting drum. Pulley 296 drives, by means of timing belt 501, the slow-down-speed-up mechanism 500, FIGURE 9, which drives the transfer drum, as will be explained in the headings, "General Machine Drives" and "Epicycloidal Transfer Drum Drive."

TRANSFER DRUMS

Figure 5:
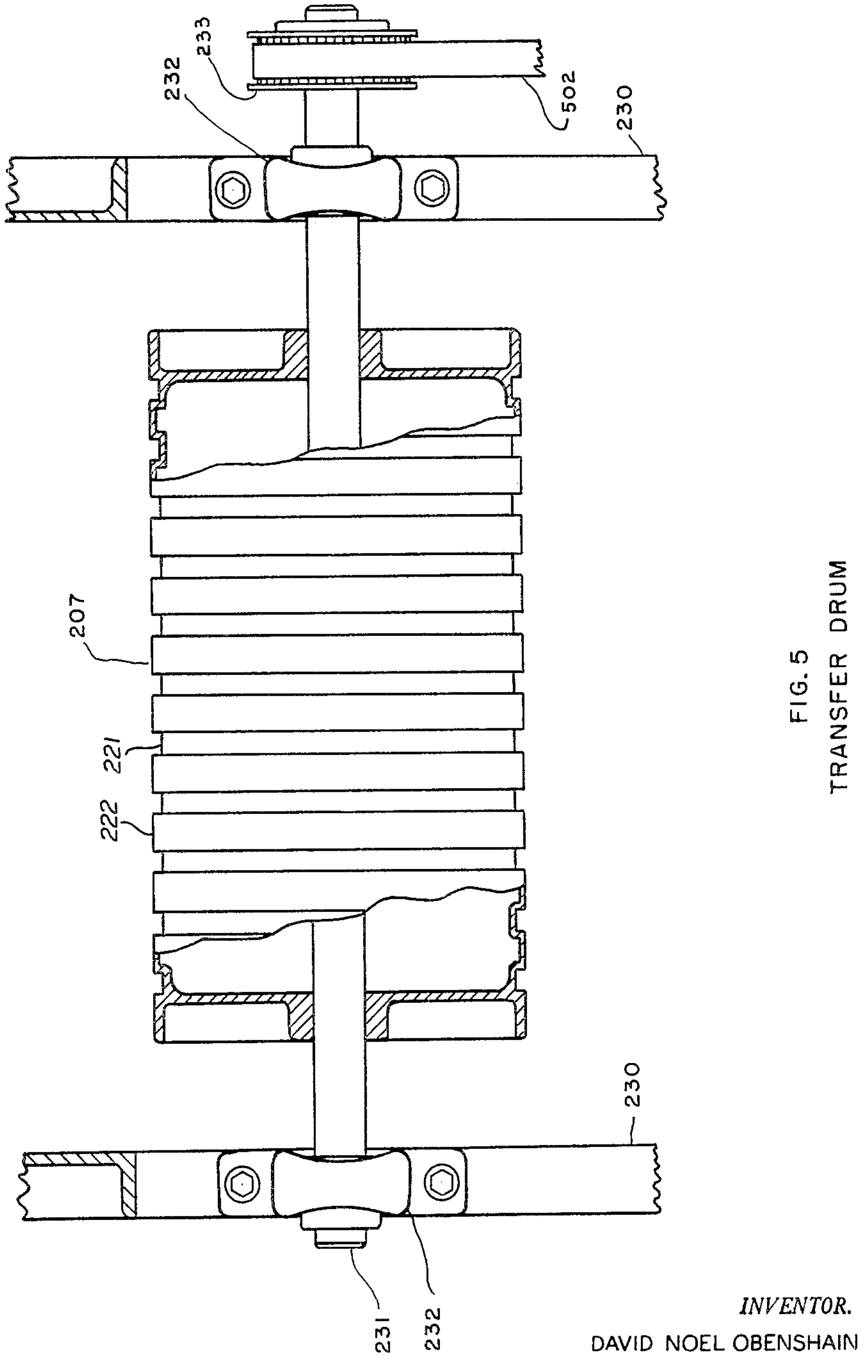
FIGURE 5 is a fragmentary view, partly broken away, of a transfer drum.

Design and assembly of a transfer drum 207 is shown in FIGURE 5. This drum is normally identical in size and grooving to the collecting drum just described. However, since this drum has to slow down and speed up many times a minute, its mass, particularly at the rim, must be kept as low as possible. Aluminum and fiber glass reinforced plastic have been found suitable for the purpose. Other types of construction can be used. The transfer drum does not require vacuum since the sheets contact it for less than one revolution and cumulative slippage cannot thus occur. The drum mounts on shaft 231 with keys and set screws (not shown). The shaft is supported in bearings 232. Outboard on the right end of the shaft is mounted with key and set screws (not shown) timing belt pulley 233 which is driven by timing belt 502 from the slow-down-speed-up drive mechanism 500, to be described later. While the diameter of the transfer drum is preferably the same as that of the collecting drum, it may be larger or smaller as long as the surface speed ratios are not changed.

While the transfer mechanism described here is a transfer drum, other mechanisms, such as a tape transporting system having the same slow-down-speed-up characteristics as the transfer drum, may be provided. Such a tape transport system is described in detail later under "Simple Single Stacker Machines."

PAPER GUIDES AND FLIPPERS

Figure 6:
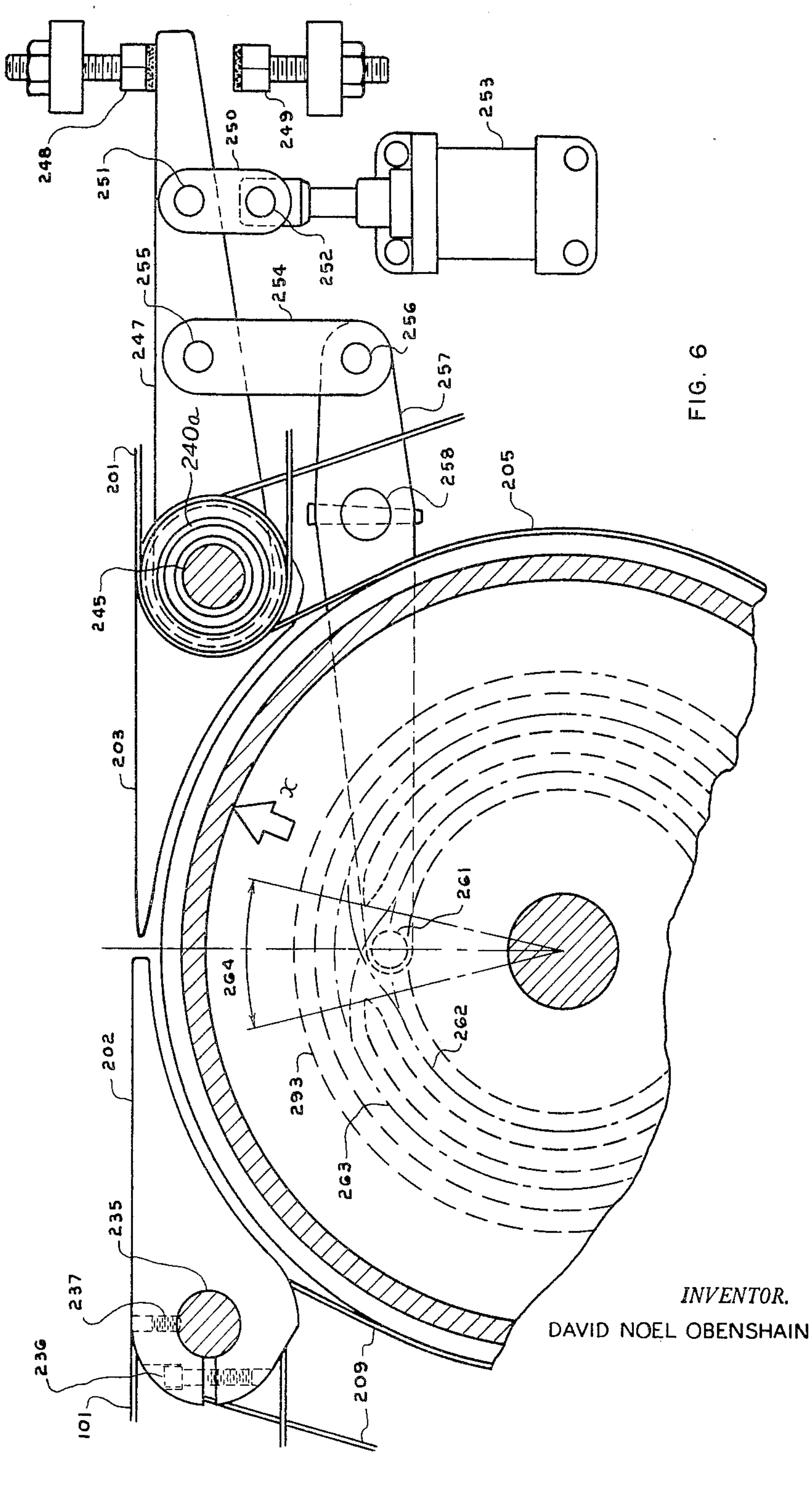
FIGURE 6 is a fragmentary view in sectional side elevation, showing in detail a combination of sheet guide, sorting flipper and collecting drum.
Figure 7:
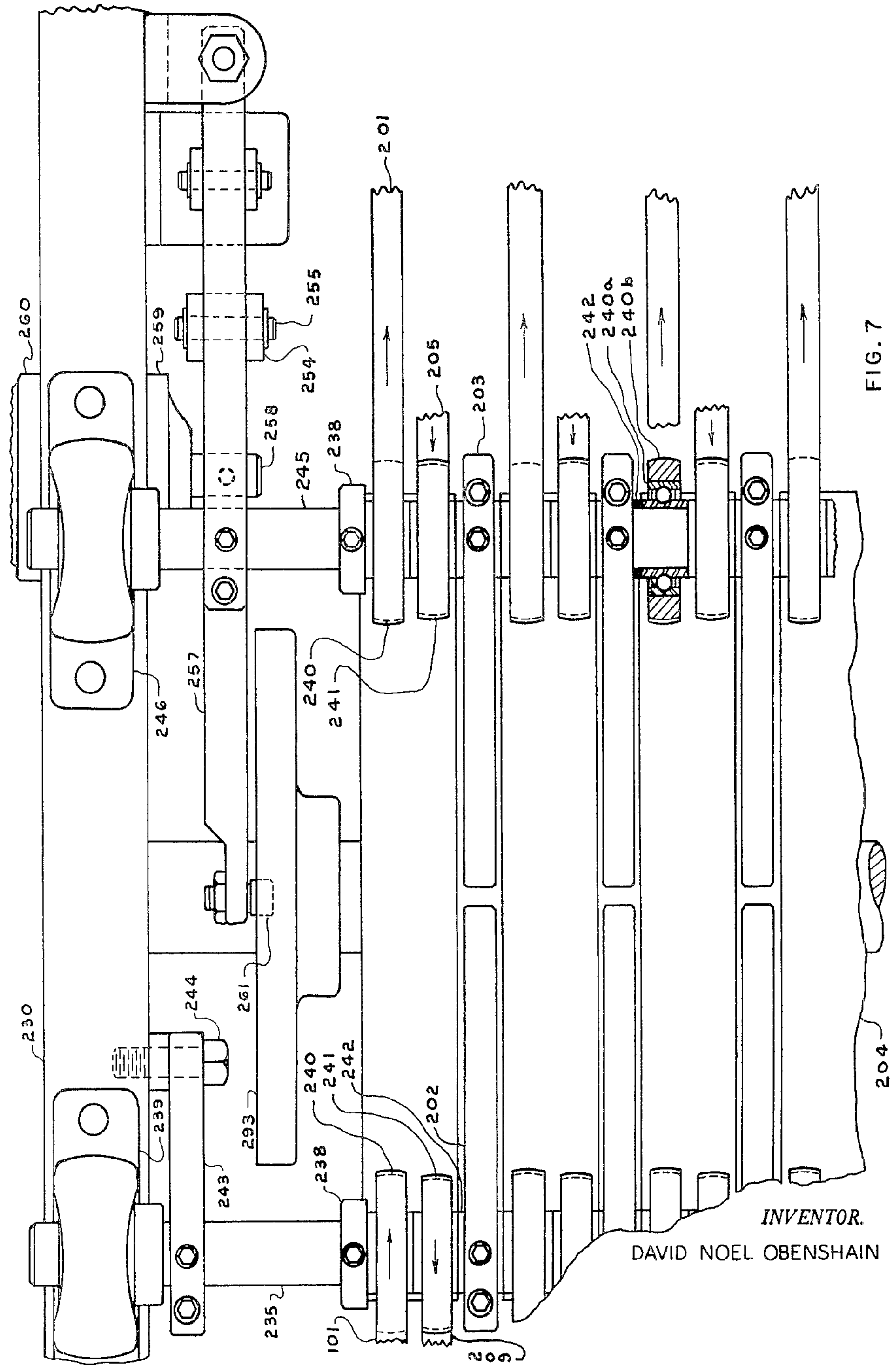
FIGURE 7 is a fragmentary plan view, partly broken away, of the mechanism of FIGURE 6.

FIGURES 6 and 7 give enlarged details of paper guides 202 and sorting flippers 203. Transfer guides 234 and transfer flippers 206 are generally similar. FIGURE 6 is a partial sectional elevation, while FIGURE 7, is a top view at the back side of the machine.

Referring to FIGURE 6, the guides 202 can be made of nylon and be about ¾ inch thick. Each is attached to a stationary shaft 235 by means of clamping screw 236 and pointed set screw 237. A hole is drilled in the shaft for the set screw 237 to maintain exact alignment of an individual guide 202 with the other guides on the shaft. The guides 202 are centered on the groove in the collecting drum as shown in top view, FIGURE 7. In this view will also be seen tape pulleys 240 and 241 arranged as shown on shaft 235. Spacer rings 242 are used to fill the gaps next to the guides. Set collars 238 clamp the various elements together on shaft 235. It will be noted that pulleys 241 are slightly smaller in diameter than pulleys 240. This is done so that the paper being carried forward by tapes 101 will not be urged back by the reverse running tapes 209. Structural details of the larger pulley 240 are shown in the sectional view of one of these larger pulleys on shaft 245. Ball bearing 240*a* has pressed onto its outer race a ring 240*b*, which is crowned as shown in order to keep the tapes in place. Pulleys 241 are identical, except the diameters are slightly smaller. The ball bearing shown is the wide inner ring sealed type, factory lubricated. Shaft 235 is supported at each end by bearings 239, mounted on the machine frame 230. Near the back frame, a clamp arm 243 is attached to the shaft. The outer end of the clamp arm is rigidly fastened to the frame by screw 244. This keeps the shaft from rotating and from moving axially, thus holding the guides 202 in the proper position. Removing screw 244 will permit swinging the guides 202 upward for clearing out any jam-ups of paper which may occur due to malfunctions of the equipment. Transfer guides 234 shown in FIGURE 3 are constructed and mounted in a similar manner to guides 202.

Sorting flippers 203 are constructed, and mounted on shaft 245, similar to guides 202. Shaft 245 is supported by bearings 246 mounted on front and back frames 230. Shaft 245 has rigidly attached to it arm 247 by which it is rotated to move the sorting flippers 203 up and down. The sorting flippers 203 are shown in the down position in FIGURE 6. The extreme end of arm 247 operates between adjustable rubber faced travel-limit screws 248 and 249. Links 250 and pins 251 and 252 connect the arm to a pneumatic cylinder assembly 253, which supplies the power for moving the sorting flipper 203. Links 254, located as shown, together with pins 255 and 256 also connect arm 247 to cam arm 257. Cam arm 257 pivots about pivot shaft 258 carried in bearings 259 and 260 (see FIGURE 7). At the end of cam arm 257 is mounted cam follower 261 which engages cam 293. Cam 293 has inner track 262 and outer track 263. Gap 264 is the only place where the cam follower can be shifted from one track to the other. This gap is located midway between the leading and trailing ends of the longest sheets for which the collecting drum 204 is designed. This makes it impossible for the sorting flippers 203 to operate except in the space between the two ends of the sheet, even though the pneumatic cylinder may be activated slightly ahead of time. A better understanding of this action may be gained from FIGURE 17 which is a somewhat diagrammatic presentation of what is shown in FIGURE 6.

Transfer flippers 206 are operated by a mechanism similar to the above, comprising arms 265, 266, links 267, 268, pivot shaft 269 and pneumatic cylinder 270 as shown in FIGURE 17. The cam follower 271 operates in the same tracks 262 and 263 of cam 293.

While I have found nylon to be an excellent material for the guides 202 and transfer guides 234, and for the sorting flippers 203 and transfer flippers 206, other materials having suitable characteristics may be used. Other means for securing the guides and flippers to the shafts, such as keys, square shafts, hexagon shafts, splined shafts, etc. may be used if desired.

The strippers 214 (FIGURES 3 and 17), mounted below the transfer drum 207 and extending into the grooves of the transfer drum 207, serve to remove the packets of sheets from the transfer drum 207.

TAPE SYSTEMS AND DRIVES

The tape system from the sheet cutter unit 20 up to the first sorter-stacker unit 100 has already been described under the heading, "Sheet Conveyors." FIGURE 3 shows the complete tape system for the No. 2 sorter-stacker unit and is typical of all three sorter-stacker units.

Tapes 101 and 42 are shown delivering sheet 34 to collecting drum 204. Sorting flippers 203 are shown in their raised position, directing the sheet 34 onto the collecting drum 204. Tapes 101 pass around ball bearing pulleys 240 mounted on shaft 235. Guides 202 and smaller ball bearing pulleys 241 are also mounted on shaft 235, as shown in FIGURES 6 and 7.

Tapes 209 leaving the ball bearing pulleys 241 pass around driving rolls 278 and 280 mounted on shaft 279 and 281, respectively, and onto pulleys 241 mounted on shaft 286, and around a portion of collecting drum 204 back to the starting point. Tapes 205 are similarly mounted at the opposite side of the collecting drum 204, passing around driving rolls 274 and 276 mounted on shafts 275 and 277 respectively.

Tapes 208 leave the ball bearing pulleys 240*b* on shaft 286, pass around transfer drum 207, onto ball bearing pulleys 283 mounted on shaft 284, over two rollers 282 and thence back to pulleys 240*b*. These tapes are driven only by contact with the transfer drum 207. Rubber rollers 215, mounted on arms 216, which arms are freely pivoted on shaft 217, keep the packet of sheets in contact with the tapes 208 until delivered onto the stack 213.

Tapes 201 which, assisted by tapes 42, transport sheets from the No. 2 sorter-stacker unit 200 to the No. 3 sorter-stacker unit 300 are driven by driving roll 272 mounted on shaft 273. Rollers 282 snub the tapes around the driving roll 272. Additional rollers 282 on top of tapes 42 depress the tapes slightly to insure firm gripping of the sheets by the tapes.

Since the tapes used are quite elastic, and are spliced 1½% shorter than the measured distance around their circuits, take-ups are not usually required.

Relative diameters of the collecting drums and of the various tape driving rolls are quite critical, in order that the tapes do not creep when in contact with the drums. In calculating diameters the thickness of the tapes must be taken into account.

Figure 8:
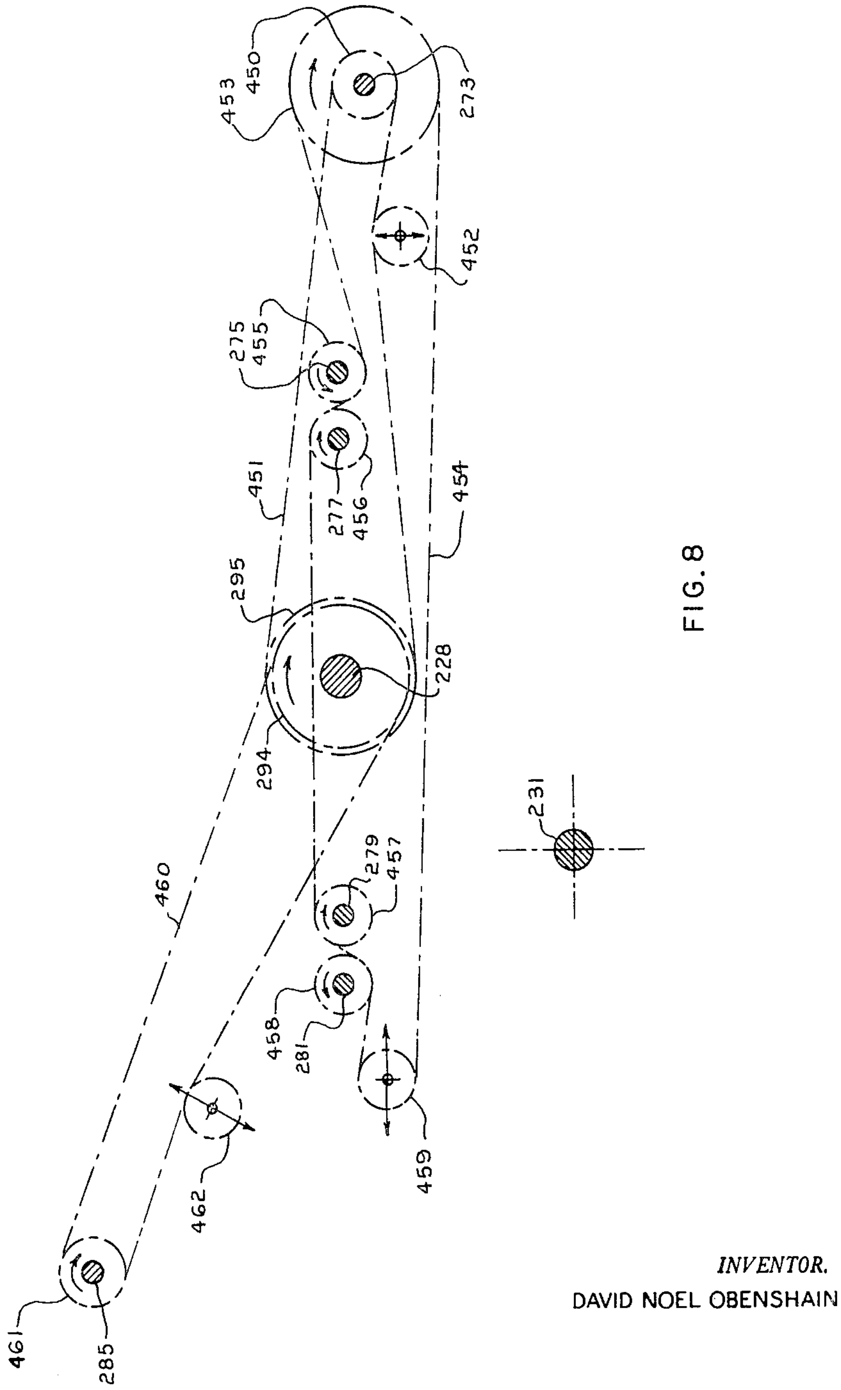
FIGURE 8 is a diagrammatic view of driving means for the sheet transporting tape system.

FIGURE 8 shows the driving arrangement for the tape drive rolls. Sprockets 294 and 295, mounted on shaft 228 of No. 2 collecting drum 204, are the main drive sprockets for the arrangement shown. Sprocket 295 drives the lower tape drive roll 272 (FIGURE 3) by means of chain 451 over sprocket 450 which is fast on shaft 273. Sprocket 453, also fast on shaft 273 of drive roll 272, drives rolls 274, 276, 278 and 280 (FIGURE 3) by means of chain 454 over sprockets 455, 456, 457 and 458 fast on shafts 275, 277, 279 and 281, respectively, of rolls 274, 276, 278 and 280. Sprocket 294 likewise drives upper tape drive roll 47 (FIGURE 1) through chain 460 over sprocket 461 fast on shaft 285 of drive roll 47. Sprockets 452, 459 and 462 are take-ups for chains 451, 454 and 460, respectively.

Other positive driving means may be used. The following data may be considered typical for a small size machine.

| | | |
|---|---|---|
| Collecting drum | inches diameter | 18.000 |
| Large driving rolls **273** | do | 8.473 |
| Small driving rolls **280** | do | 3.359 |
| Tape thickness **101**, **42** | do | 0.050 |
| Sprockets **294**, **295** | teeth | 36 |
| Sprockets **450**, **461** | do | 17 |
| Sprocket **453** | do | 40 |
| Sprockets **455**, **456**, **457**, **458** | do | 16 |

GENERAL MACHINE DRIVES

Figure 9:
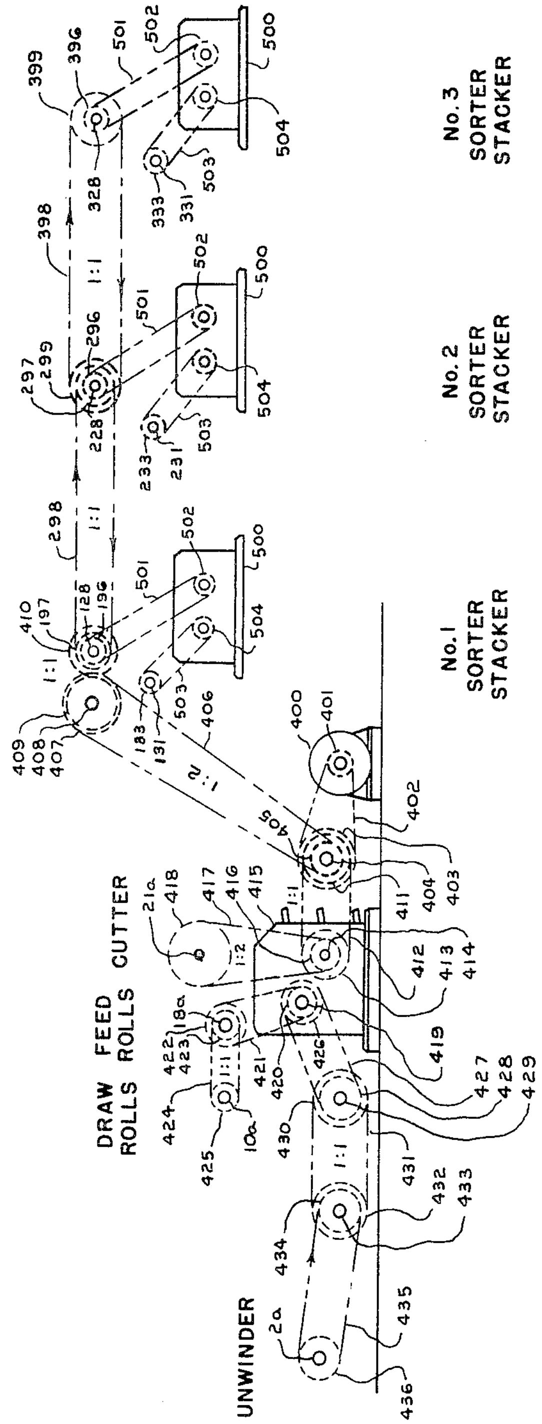
FIGURE 9 is a diagrammatic view of the general drive arrangement for the entire machine.

The general drive arrangement of the entire machine is given in FIGURE 9. This drawing is diagrammatic rather than strictly to scale, for purposes of showing the arrangement rather than details. The 400 numbering series is used to identify various parts of the general drive.

Motor 400 is preferably a variable speed D.C. type, in order to provide smooth start-up and acceleration and to provide dynamic braking for emergency stops. It drives jack shaft 404 by means of pulley 401, timing belt 402 and pulley 403. The ratio of this drive determines the maximum machine speed. V-belts or other types of driving mechanisms could be used here.

Jack shaft 404 has mounted on it sprocket 405 which, through roller chain 406 and sprocket 407, drives jack shaft 408. The ratio between jack shaft 404 and jack shaft 408 is 2:1; jack shaft 408 runs at half the speed of jack shaft 404. Jack shaft 408 has mounted on it spur gear 409 which engages spur gear 410 on No. 1 collecting drum shaft 128 in a 1:1 ratio. These spur gears 409 and 410 are necessary to reverse the direction of rotation as required by the drums. Arrows are shown on the various drives to indicate the rotation.

Mounted on shaft 128 is sprocket 197 which together with roller chain 298 and sprocket 297 drives shaft 228 of No. 2 collecting drum in a 1:1 ratio. In like manner sprocket 299, chain 398 and sprocket 399 drive shaft 328 of No. 3 collecting drum.

Also mounted on shaft 128 is timing pulley 196 which, with timing belt 501 and pulley 502, drives the input shaft 505 of slow-down-speed-up drive unit 500. Timing pulley 504 on the output shaft of the slow-down-speed-up drive unit 500, together with timing belt 503 and pulley 133, in turn drives the shaft 131 of the No. 1 transfer drum 207. Similar drives, as shown, are used at the No. 2 and No. 3 sorter-stacker units.

Returning to jack shaft 404, pulley 411 mounted thereon which, together with timing belt 412 and pulley 413, drives input shaft 414 of the drive unit 415. The drive unit 415 permits rapid original and repetitive, precisely predetermined, sheet length settings over a very wide range. Conventional change gear mechanisms may be used in this place.

Also mounted on input shaft 414 is sprocket 416. By way of silent chain 417, sprocket 416 drives sprocket 418 in a 2:1 ratio. Sprocket 418 is mounted on shaft 21*a* of the cutter drum 21. Thus, it will be seen that the cutter drum 21 and the collecting drums 104, 204 and 304 all rotate at the same speed. Initial synchronizing of the collecting drums is done by slipping the various chain drives involved until point $x$ on each drum coincides with the trailing edge of sheets reaching the drum.

The output shaft 419 of drive unit 415 has mounted upon it a sprocket 420 which, together with silent chain 421 and sprocket 422, drives shaft 18*a* of the web feed rolls 18. The ratio of this drive depends on the output-input ratio of the drive unit 415, and the circumferences of the driven feed rolls 18 and draw rolls 10 of FIGURE 1. A 1:1 ratio timing belt drive comprising sprocket 423, timing belt 424 and sprocket 425 connects shaft 10*a* of the web draw roll 10 to shaft 18*a*, thus turning the draw rolls 10 at the same speed as the feed rolls.

When a flying splice unwinder is used, additional drives from output shaft 419 of the drive unit 415 must be provided to drive the unwinder input shaft 2*a*. These are provided as shown by sprockets, roller chains and jack shafts numbered 426 to 436 inclusive.

It will be noted that three types of drives have been described for the machine. The drives between the input shaft 414 of the drive unit 415 and the sheet cutter unit 20, and between the output shaft 419 of the drive unit 415 and feed rolls 18 are the most critical. These drives, together with the drive unit 415, largely establish the sheet length precision that may be obtained with the machine. Play and backlash in these drives must be kept to a minimum. Silent chain drives have proved the most satisfactory in this application. All other drives are less critical and timing belt and roller chain drives have proved satisfactory for these other drives.

Obviously, many variations on the driving means may be used such as lineshafts with bevel gear units, etc., as long as the required ratios and directions of rotation are maintained, and flexure is kept to a minimum.

EPICYCLOIDAL TRANSFER DRUM DRIVE

Several types of slow-down-speed-up mechanisms have been used to provide the delivery cycle operation of the transfer drum. FIGURES 10, 11, 12 and 13 show an illustrative supplemental or auxiliary drive mechanism of the epicycloidal type.

Drive from the shaft 228 of the collecting drum 204 to the slow-down-speed-up unit 500 is by way of timing belt pulley 296, timing belt 401, and timing belt pulley 502 on input shaft 505. Output is from shaft 506, through timing pulley 504 and timing belt 503 to timing pulley 233 on shaft 231 of transfer drum 207.

Figures 10, 11, 12, 13:
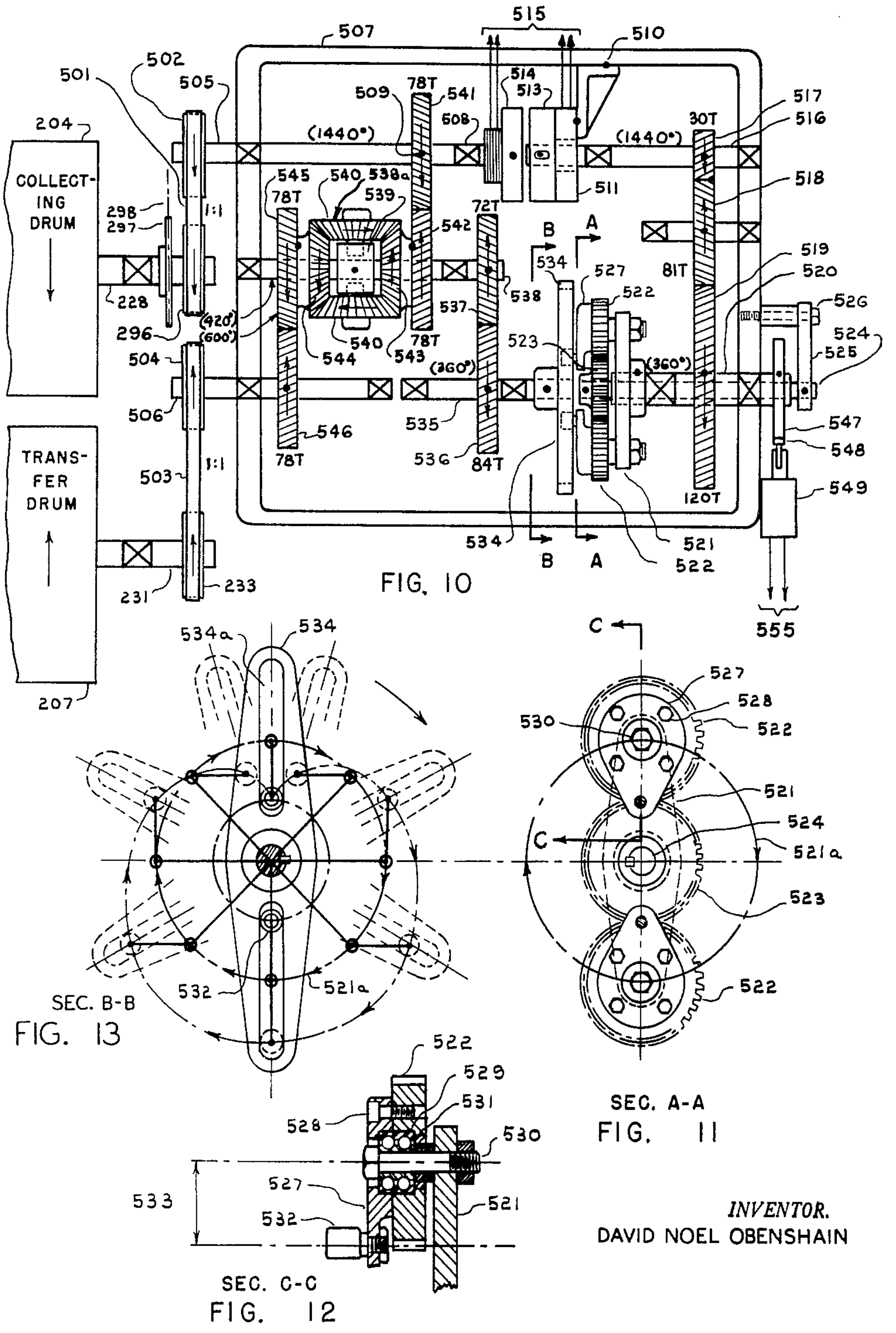
FIGURE 10 is a plan view of an epicycloidal drive mechanism for the transfer drum.
FIGURE 11 is a sectional view of the epicycloidal drive mechanism taken along line A—A of FIGURE 10, looking in the direction of the arrows.
FIGURE 12 is a sectional view of the epicycloidal drive mechanism taken along line C—C of FIGURE 11 looking in the direction of the arrows.
FIGURE 13 is a sectional view of the epicycloidal drive mechanism taken along line B—B of FIGURE 10, looking in the direction of the arrows.

The whole slow-down-speed-up unit 500 is preferably housed in an oil-tight casing 507 and arranged as shown in FIGURE 10. In this drawing, bearings, preferably anti-friction, are indicated by diagonally crossed lines in rectangular blocks as per 508. Arrows are used to indicate the direction of rotation as viewed. Large solid dots as per 509 indicate a rigid connection to a shaft, or between several elements as per 510. Most of the gears have helical teeth as indicated by the diagonal lines. This minimizes noise and gives smoother operation. The degrees of rotation indicated are those for one slow-down-speed-up cycle which takes place while the collecting drum 204 makes 4 revolutions or 1440 degrees rotation.

Operation can best be explained by starting with the unit in transfer mode, that is, with both the collecting drum 204 and the transfer drum 207 running at the same speed. Magnetic brake 511 is energized, thus holding clutch-brake rotor 513 stationary. Magnetic clutch 514 is de-energized. Electrical leads 515 come from the sorter-stacker relay rack as explained later in connection with the control system. Shaft 516, being attached to clutch-brake rotor 513, is thus held stationary. It will be seen that this locks the whole train of gears from 517 to 537 so that none of these gears can rotate. These gears in turn lock center shaft 538 of the bevel gear differential 538*a* which carries a pair of bevel spider gears 540.

Input shaft 505 has attached thereto 78 tooth gear 541 which engages 78 tooth gear 542. Gear 542 is attached to bevel gear 543 which is free to rotate on shaft 538. At the other side of the differential is bevel gear 544, also free to rotate on shaft 538. Bevel gear 544 has attached to it 78 tooth gear 545 which engages 78 tooth gear 546 attached to output shaft 506. It can be seen that rotating the input shaft 505 in the direction indicated by the arrow will result in an equal rotation of the output shaft 506 in the opposite direction. Thus, if the collecting drum 204 is running at 200 r.p.m., the transfer drum 207 will run at 200 r.p.m. in the opposite direction. This is the condition required when a packet of five sheets is being transferred from the collecting drum 204 to the transfer drum 207 as explained earlier.

As soon as the trailing edge of the packet of sheets is free of the collecting drum 204, magnetic brake 511 is de-energized and magnetic clutch 514 is energized. This shifts clutch-brake rotor 513 out of engagement with brake 511 and into engagement with clutch 514, and results in the rotation of shaft 516 in unison with shaft 505. Thirty tooth gear 517 then drives, by way of 81 tooth idler gear 518, 120 tooth gear 519 which is attached to hollow shaft 520. Thus every time shaft 516 rotates 4 times, hollow shaft 520 will make one complete revolution, in the same direction as shaft 516.

Attached to hollow shaft 520 is the epicycloidal mechanism comprising parts 521 through 534. Arm 521 has attached to its opposite ends 40 tooth spur gears 522 as shown in FIGURE 11, and as per details given in FIGURE 12. Each spur gear 522 has attached to one side, crank arm 527 by means of screws 528. Each crank arm 527 holds a ball bearing 529 in a recess in the spur gear 522. The ball bearing 529 is attached to arm 521 by means of bolt 530 and spacing collar 531. Each spur gear 522 has mounted on it, at a distance 533 (FIGURE 12) from the spur gear axis which is exactly the pitch radius of the spur gear, a cam follower 532, as shown in FIGURE 12.

Figure 14:
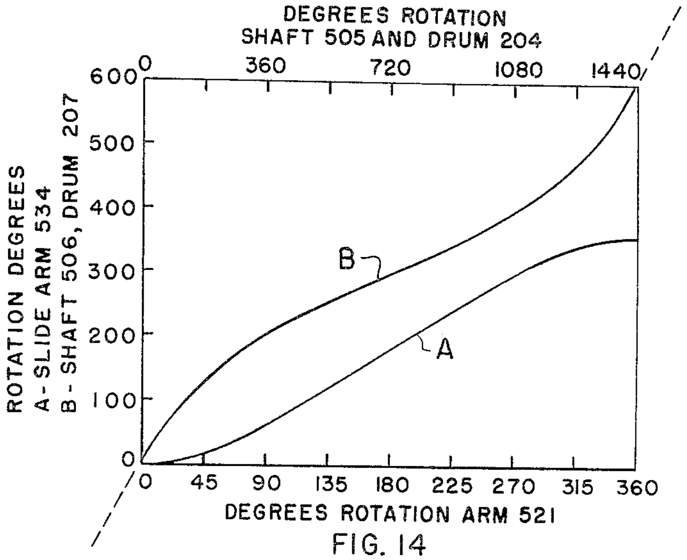
FIGURE 14 is a graph of the motions produced by the epicycloidal mechanism.

A third, 40 tooth spur gear 523 is mounted between the two spur gears 522 and supported on a shaft 524 which passes through the hollow shaft 520 to outside the casing. Arm 525 is attached to the end of shaft 524 and is anchored to the casing by means of screw 526. This holds shaft 524 and spur gear 523 stationary at all times. Thus, as the arm 521 rotates, as indicated by the arrows on circle 521*a*, the spur gears 522 rotate on their axes, as indicated by the arrows. The cam followers 532 engage slots 534*a* in a slide arm 534 as shown in FIGURE 13. This results in an epicycloidal acceleration and deceleration of slide arm 534 when arm 521 is rotated at a constant speed. FIGURE 14, curve A, shows graphically the motion imparted to slide arm 534. While arm 521 is rotated at a constant speed, it will be seen that slide arm 534 goes from zero velocity to a maximum velocity and back to zero velocity each revolution. As the speed of slide arm 534 is progressively increased, it reduces the output speed of gear 545, and as the arm 534 loses speed it causes the output speed of gear 545 to build up again to normal. For a slow-down-speed-up cycle of the transfer drum 207, the epicycloidal mechanism makes exactly one revolution, no more and no less. This is insured by cam 547 attached to the outer end of shaft 520. When a slow-down-speed-up action has been completed, lobe 548 of the cam engages roller actuated switch 549, which through cable 555 and appropriate relays (FIGURE 25) de-energizes clutch 514 and energizes magnetic brake 511, thus holding the auxiliary drive mechanism at rest. The starting signal transmitted from counter 720 through cable 723 momentarily overrides switch 549 at the beginning of a slow-down-speed-up cycle of the transfer drum 207. Once the cam lobe 548 leaves the roller of switch 549 the switch is closed and nothing can stop the action of the auxiliary drive mechanism until the lobe 548 returns to the starting position at the end of a complete revolution, again opening the switch 549.

Slide arm 534 is attached to shaft 535 and thus imparts the epicycloidal motion to that shaft. Attached to shaft 535 is 84 tooth gear 536 which engages 72 tooth gear 537 attached to center shaft 538 on the bevel gear differential 538*a* to rotate a total of 420 degrees starting from zero velocity, going to a maximum velocity and then back to zero velocity, with relative motion as per FIGURE 14, curve A.

Figure 15:
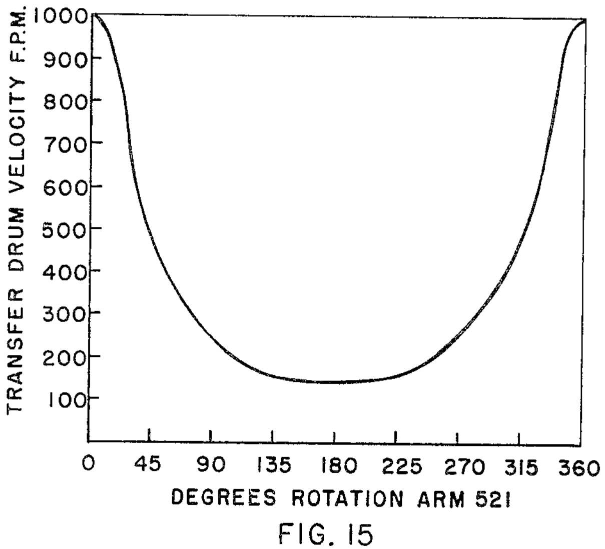
FIGURE 15 is a graph of the sheet velocities produced by the epicycloidal mechanism.

From bevel gear differential formulas, it may be shown that while input gear 543 is turning 1440 degrees and cage 538 is turning 420 degrees in the same direction, output gear 544 will be turning 600 degrees in the opposite direction, slowing down smoothly and progressively to 15% of its maximum speed during 300 degrees rotation of input gear 543 and then accelerating smoothly and progressively back up to maximum speed in the second 300 degrees of rotation. This rotation is transmitted to output shaft 506 by means of 78 tooth gears 545 and 546. The relative rotation of input shaft 505 and output shaft 506 is shown as curve B in FIGURE 14. The same relation holds for transfer drum 207 and collecting drum 204, since they are driven at 1:1 ratios from the shafts 505 and 506. FIGURE 15 shows the transfer drum surface velocity produced for a transfer slow-down-speed-up cycle when running at 1000 f.p.m. collecting drum velocity. From this curve it will be seen that the final delivery velocity of the paper is around 150 f.p.m. It would thus be possible to operate at drum velocities up to 1660 f.p.m. before reaching the critical stacking velocity of 250 f.p.m. where sheets are likely to be damaged by the impact against the back stops.

The gear teeth and ratios given herein are for purposes of illustration only and are in no way to be interpreted as limitations, nor is the arrangements and configuration of the epicycloidal gear box assembly of FIGURE 10 limited to that illustrated.

STACKER DETAILS

All three sorter-stacker units 100, 200, and 300 shown in FIGURE 1 are substantially identical. No. 2 sorter-stacker unit 200 will be described in detail as shown in FIGURES 1, 3 and 17. It consists of hydraulic stack elevator 288, platform 289, stacking skid 290, joggers 210, 211, 212, air pipe 218, air jet conduit 219, stacker tamper 600, ream flag inserter 670, and stack height controller 679. Each of these items will be described forthwith in detail.

The stack elevator 288 shown is an oil-hydraulic type which I have found to operate quite satisfactorily. In accordance with conventional practice, liquid is pumped into the jack by a motor driven pump (not shown) to raise the elevator, and is bled off by a relay operated valve (not shown) to lower the elevator. Other types of elevator mechanisms, such as screw jacks, chain lifts, cable lifts, etc., may be used as long as they are well guided and can maintain alignment of the stack of paper as the stack is built to its full height. The elevator platform 289 is approximately the size of the maximum size sheet which can be handled by the machine. In its lowest position the top of the platform is substantially at floor level to permit removal of the finished skid of paper by lift truck or other means.

The paper may be stacked directly on a shipping skid 290 as shown. Preferably stacking of the paper is done on a stacking board (not shown) which board has dimensions matching the sheet size and takes the place of the shipping skid 290. The stacking board rests on legs on or attached to the platform. The stack of paper on the stacking board is removed by a lift truck and transported to a remote location. An inverted shipping skid is then placed on top of the stack, clamped in a skid inverter and turned over. Other means of transferring the paper from the stacking board to the shipping skid may, of course, be used.

The joggers 210, 211 and 212 are of the high speed impact type as described in my U.S. Patent 3,062,539. Other jogger mechanisms may be used. However, I have found the type described in the above mentioned application to give superior results.

I have found air pipe 218 and air jet conduit 219 (FIGURE 3) to be quite essential for satisfactory stacking. Air pipe 218 has ⅛ inch holes 218*a* spaced on 4 inch centers and is supplied with low pressure (3 p.s.i.) air at both ends. The air is directed horizontally under the incoming packet of sheets and partially floats the packet onto the stack. The air jet conduit 219 contains four vertical exit slits 219*a* which are ⅛ inch wide by 1½ inches high, and which direct low pressure (3 p.s.i.) air into the end of the stack near the top. This action separates the individual sheets slightly, permitting the joggers 210, 211 and 212 to move all incoming sheets into register with those already on the stack.

For some grades of paper it is necessary to use the stack tamper 600 to remove the excess air from between the sheets. This is particularly true for large sheets of lightweight papers. The stack tamper 600 is lowered until the tamper feet 610 contact the stack, as shown by dotted positions 610*a*. The stack tamper 600 is quickly raised automatically to the condition shown in FIGURES 3, 17, 20 and 21 an instant before the next packet of sheets emerges from the rubber rollers 215. The engagement of the stack tamper 600 with the stack, under automatic operation, is made brief in order to avoid objectionable conflict with the action of the joggers 210, 211 and 212.

Tamper feet 610 may be moved to the extreme up position 610*b* by operation of the up button 760 when desired, for example to facilitate the removal of sheet from the top of the stack.

Figures 20, 21:
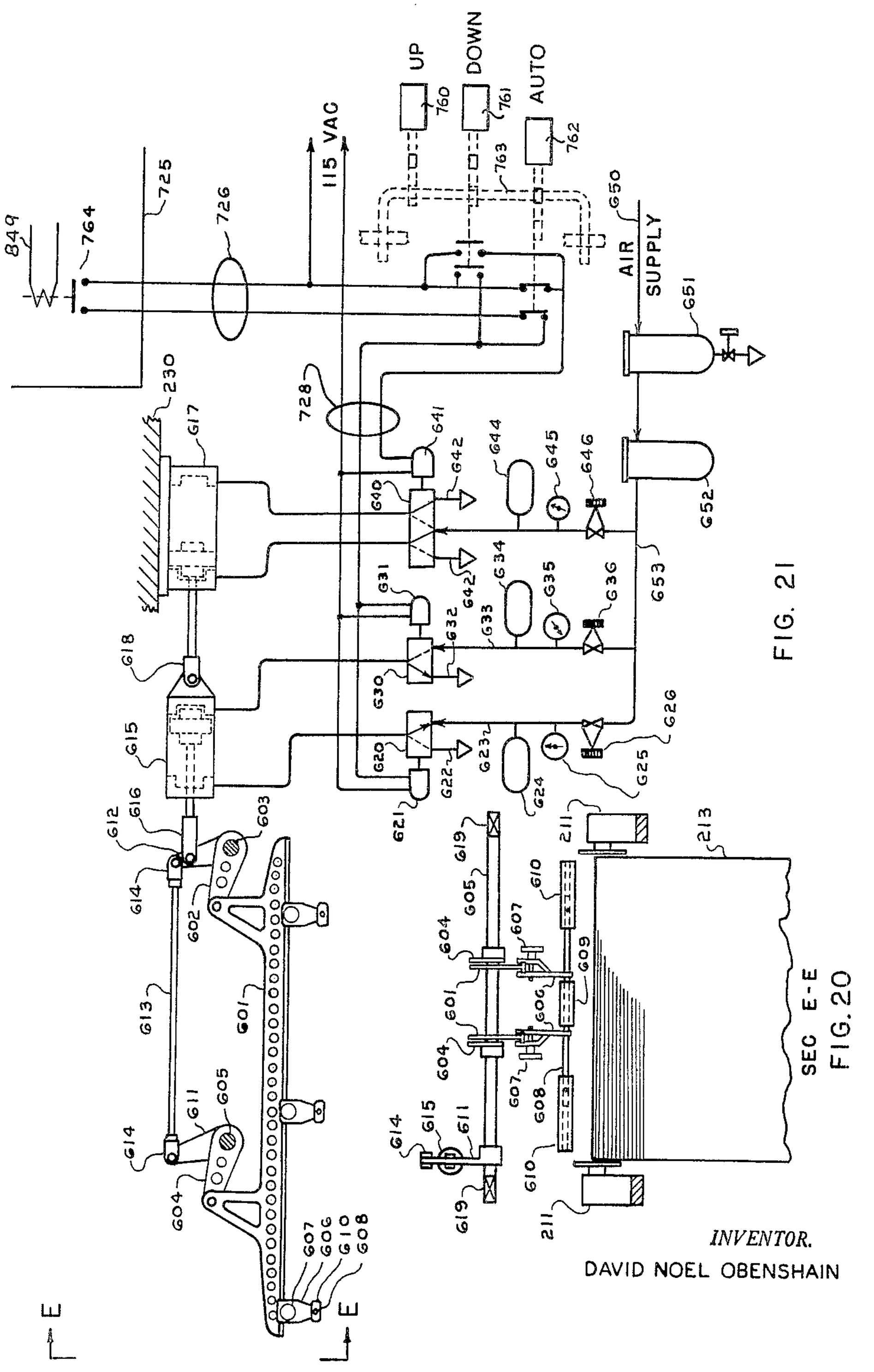
FIGURE 20 is an end view showing principall the stack tamper.
FIGURE 21 is a partly diagrammatic view of the operating means for the stack tamper.

FIGURE 3 is a side view of the stack tamper assembly and FIGURE 20 is an end view of the same. FIGURE 21 shows the tamper complete with pneumatic cylinder operating mechanism in somewhat schematic form. Most moving parts of the stack tamper 600 are constructed of aluminum and other light weight materials to facilitate rapid movement. Holes and openings are used where possible to further reduce the weight of the parts.

Two tamper supporting bars 601 are attached to pairs of parallel motion arms 602 and 604, mounted on shafts 603 and 605, respectively. Three tamper legs 606 are clamped to each bar by means of handwheels 607. The legs 606 may be moved to any suitable location on the bars to accommodate the size of sheets being stacked. Rods 608 are secured to the bottom ends of the legs and have attached thereto the tamper feet 609 and 610. The tamper feet 609 and 610 are made of wood and are attached to the rods 608 by means of set screws, (not shown). The center feet are fixed in position. The outside feet may be adjusted in or out as desired to accommodate the stack width.

The shafts 603 and 605 are mounted in bearings 619 at their ends. Lever arms 611 and 612 are attached to the shafts 605 and 603 respectively near their back ends and are connected to one another by means of connecting rod 613 and clevises 614. A piston 615*a* in a pneumatic cylinder 615 is also connected to lever arm 612 by means of clevis 616 as shown. Pneumatic cylinder 615 is, in turn, connected to a piston 617*a* in a second pneumatic cylinder 617 by means of clevis 618. Pneumatic cylinder 617 is rigidly attached to the machine frame 230. Both pneumatic cylinders 615 and 617 have adjustable air cushions at both ends. Pneumatic cylinder 615 provides the normal up and down motion of the stack tamper 600, while piston 617*a* in pneumatic cylinder 617 provides adjustable support for pneumatic cylinder 615. Both pistons 615*a* and 617*a* are fully retracted when lifting the stack tamper 600 to its uppermost position, out of the way for removal of sheets from the stack.

Pneumatic cylinder 615 is controlled by two 3-way solenoid valves 620 and 630 equipped with solenoids 621 and 631 respectively. Both solenoids 621 and 631 are shown de-energized. The solid lines within the solenoid valves 620 and 630 indicate the flow connections automatically established whenever the solenoids 621 and 631 are de-energized. The dotted lines indicate the flow connections maintained so long as the solenoids 621 and 631 are energized. Two 3-way solenoid valves 620 and 630 are used here, since different air pressures are required for the up stroke and the down stroke of the stack tamper 600, due to its unbalanced weight.

Pneumatic cylinder 617 is controlled by a single 4-way solenoid valve 640 equipped with solenoid 641. In the solenoid valve 640, as in the case of valves 620 and 630, the solid lines indicate the flow connections automatically established whenever the solenoid 641 is de-energized and the dotted lines indicate the connections maintained so long as the solenoid 641 is energized.

Connections 622, 632 and 642 are exhausts to atmosphere. Air accumulators 624, 634 and 644 are used to store air for the rapid actuation of the pistons 615*a* and 617*a*. Pressure gauges 625, 635 and 645 are used when setting the air pressures for the respective system, through manually settable automatic pressure regulating valves 626, 636 and 646. The high pressure air supply 650 goes to air filter 651, oiler 652, then through line 653 to the three pressure regulating valves 626, 636 and 646.

Figure 23:
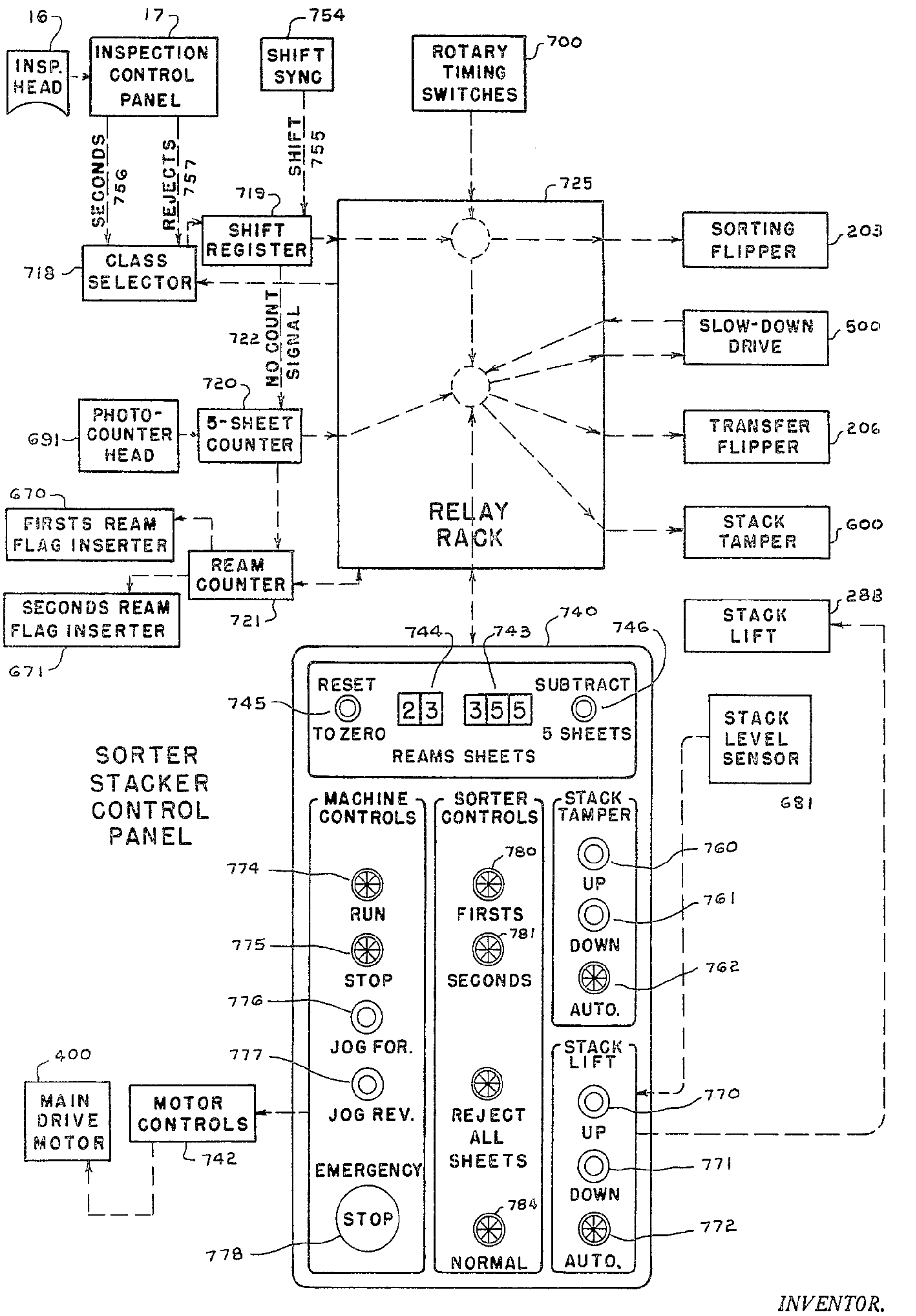
FIGURE 23 is a block diagram for the control system for a sorter-stacker unit including layout of the control panel.

The stack tamper 600 is controlled by means of a set of three interlocking push button switches 760, 761, 762 shown on stacker control panel 740 in FIGURE 23. The interlocking button set is of conventional construction, being designated as model 10LP–3–20 of Switching Controls Corp, North Hollywood, California. FIGURE 21 show diagrammatically the actual hook-up of the buttons 760, 761 and 762. One of the buttons will always be latched in the depressed position by a common, yieldable latch bar. Only one button may be depressed and latched at a time. The depressing of any free button causes release and replacement of the button currently latched in the depressed position.

The stack tamper system is shown in FIGURE 21 with the "AUTO" button 762 depressed. This unconditionally energized solenoid 641, carrying the piston 617*a* to the left end of cylinder 617, and conditions the circuits to energize solenoids 621 and 631 for carrying piston 615*a* to the left end of cylinder 615 whenever switch 764 is closed. Switch 764 is automatically closed for a short period only, at an appropriate point in the transfer cycle, as will be explained at a subsequent point. The stack tamper 600 is thereby lowered onto the stack. Opening of switch 764 de-energizes 621 and 631 and causes the stack tamper 600 to be returned to its normal position as illustrated in FIGURE 21.

Pushing the "DOWN" button 761 energizes all three solenoids 621, 631 and 641, thus lowering the stack tamper 600 onto the stack and holding it there.

When the "UP" button 760, which has no contacts of its own, is depressed, it releases all of the contacts of either button 761 or 762 and de-energizes the three solenoids 621, 631 and 641. This de-energizing action retracts both pistons 615*a* and 617*a* lifting the stack tamper 600 to the extreme up position and holding it there.

A ream flag inserter 670 is shown in FIGURE 17 When it receives a signal from the ream counter 721 (FIGURE 23) it portions out a length of paper ribbon 672 onto the top of the stack 213. After two more five-sheet packets have been delivered onto the stack, another signal from the ream counter 721 actuates a shear (not shown) which cuts off the ribbon close to the end of the inserter, and the weight of the two five-sheet packets holds the flag in place. Items 673 are flags which have already been inserted. When stacking two quality grades of sheets, each sorter-stacker unit is equipped with two ream flag inserters 670 and 671, each ream flag inserter having a ribbon of distinctive color and width. The inserter ribbon reels are so made that they cannot be placed in the wrong ream flag inserter. The ream flag inserts are interlocked (FIGURE 25) with the control system so that it is impossible to insert incorrect flags in the sheets being stacked. While the operator could intentionally or accidently stack two grades of paper on the same skid, the ream flags would positively identify the grades in the stack.

The ream flag inserters used are commercially available, being sold by Miller Lauffer Printing Equipment Corporation, 280 Lafayette Street, New York 12, New York and each includes one Countron "1000" Predetermined Counter and one Tally-Tab Inserter head.

Also shown in FIGURE 17 is the photoelectric stack height controller 679. Lamp unit 680 projects a beam of light at the end of the stack 213 near the top. The photocell unit 681 receives light reflected from the sheets. If the level of the stack rises above the center of the light spot, projected from lamp unit 680, the photocell unit 681 actuates a relay which lowers the stack until it drops below the center of the light spot. A five-second delay is incorporated in the relay energizing circuit to minimize chatter of the relay due to the arrival of new sheets on the stack. Both the lamp unit 680 and the photocell unit 681 are mounted together on a support (not shown) which may be raised or lowered as required for different stacking levels.

TIMING MECHANISM

Figure 18:
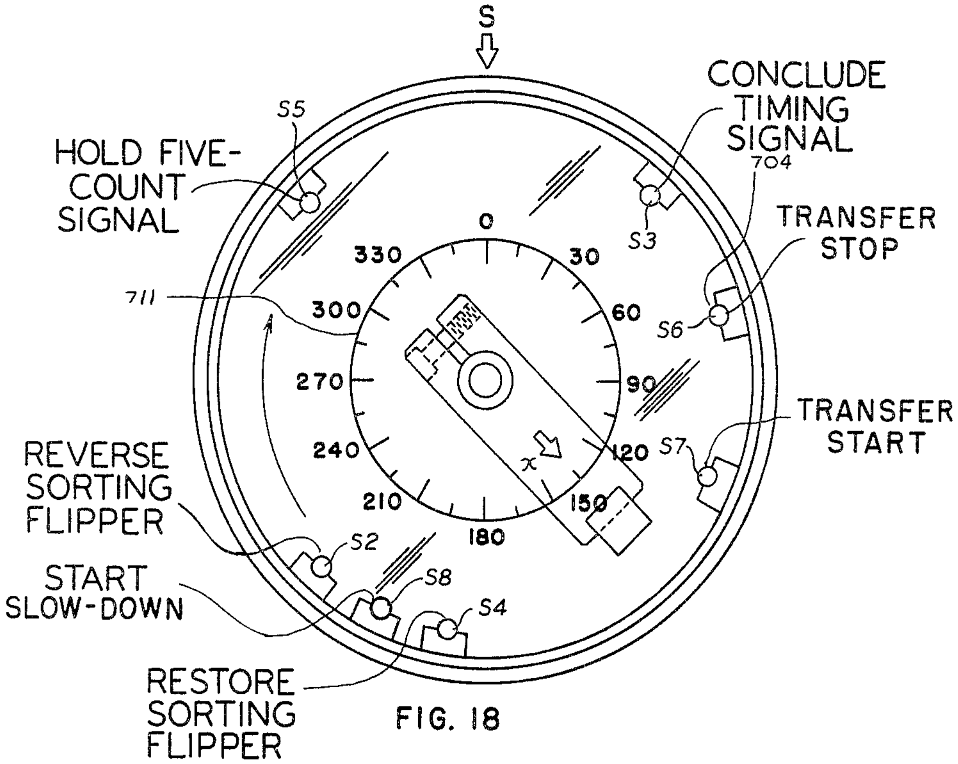
FIGURE 18 is a plan view of the timing mechanism of FIGURE 4.
Figure 19:
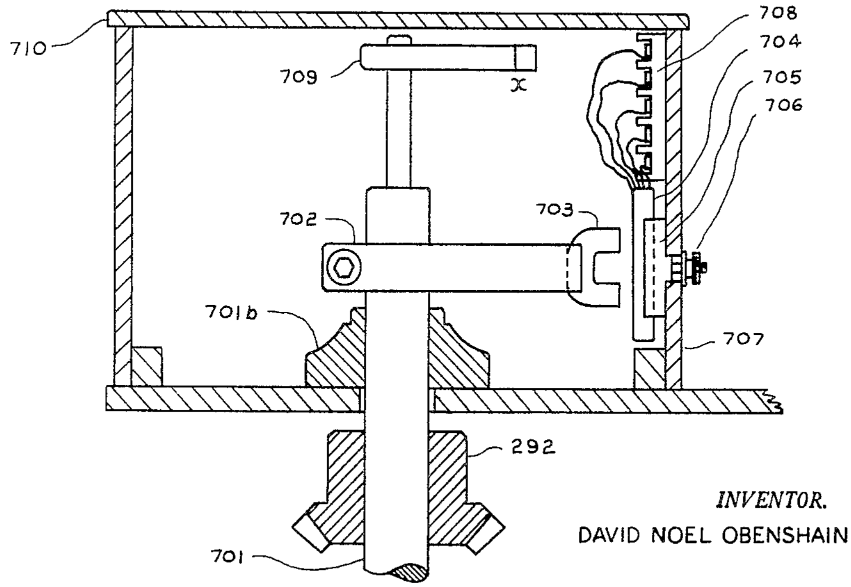
FIGURE 19 is a vertical sectional view of the timing mechanism of FIGURE 4.

Precise timing control of the operation of the sorting flippers, the transfer flippers, the transfer slow-down-speed-up drive and the stack tamper of each sorter-stacker unit is extremely important. When operating at 200 sheets per minute, the sorting and transfer flippers must make their full travel in less than 35 milliseconds. Rotary timing switch unit 700, location and details for which are shown in FIGURES 4, 18 and 19, is used for this purpose. The rotary timing switch unit 700 is driven from the collecting drum shaft 228 by means of miter gears 291 and 292. Gear 292 is mounted on shaft 701 which is supported in bearings 701*a* and 701*b*. Shaft 701 therefore rotates turn for turn with the collecting drum 204. The upper portion of the shaft has attached thereto arm 702 which carries permanent magnet 703 at its end. At the extreme upper end of shaft 701 is mounted pointer 709. Both the pointer 709 and magnet 703 are so aligned on the shaft that they are at pointer S in FIGURE 18, when pointer X on collecting drum 204 is at pointer S in FIGURE 17. The pointer S of the rotary timing switch 700 is at zero degrees on the etched scale of transparent cover 710 of timing unit housing 707. Mounted around the inside of housing 707 as shown are hermetically sealed magnetically operable switches 704 having mercury wetted contacts. Switches of this type can be operated very precisely for billions of times. The switches 704 are held in clips 705 and attached to the housing 707 by means of screws 706. It can be seen that as the collecting drum rotates the magnet 703 will be caused to rotate past the various switches, thus timing the various operations labeled in FIGURE 18. These switches are used to energize relays in the relay rack 725, which relays in turn supply the properly timed actuating signals to the various operating mechanisms, namely the sorting flipper 203, the slow-down drive 500, the transfer flipper 206, and indirectly the stack tamper 600. It will be noted that the sorting flipper reversing switch is initiated well in advance of the actual time that the flipper 203 will operate. This gives the control relay in relay rack 725 and the solenoid valve 713 time to operate and so pre-load air cylinder 253, so that the instant the gap in cam 293 reaches cam roller 261, the cam roller 261 can fly through, thus permitting sorting flipper 203 to drop down and allow the approaching sheet to pass by. This same advance timing applies to the sorting flipper restoring, transfer starting, and transfer stopping switches. "Slow-down start" and "slow-down stop" switches are only very slightly advanced, since these actions have very little time lag.

THE CONTROL OF THE SORTER STACKER UNITS

(a) *The signals to the shift registers*

Figure 22:
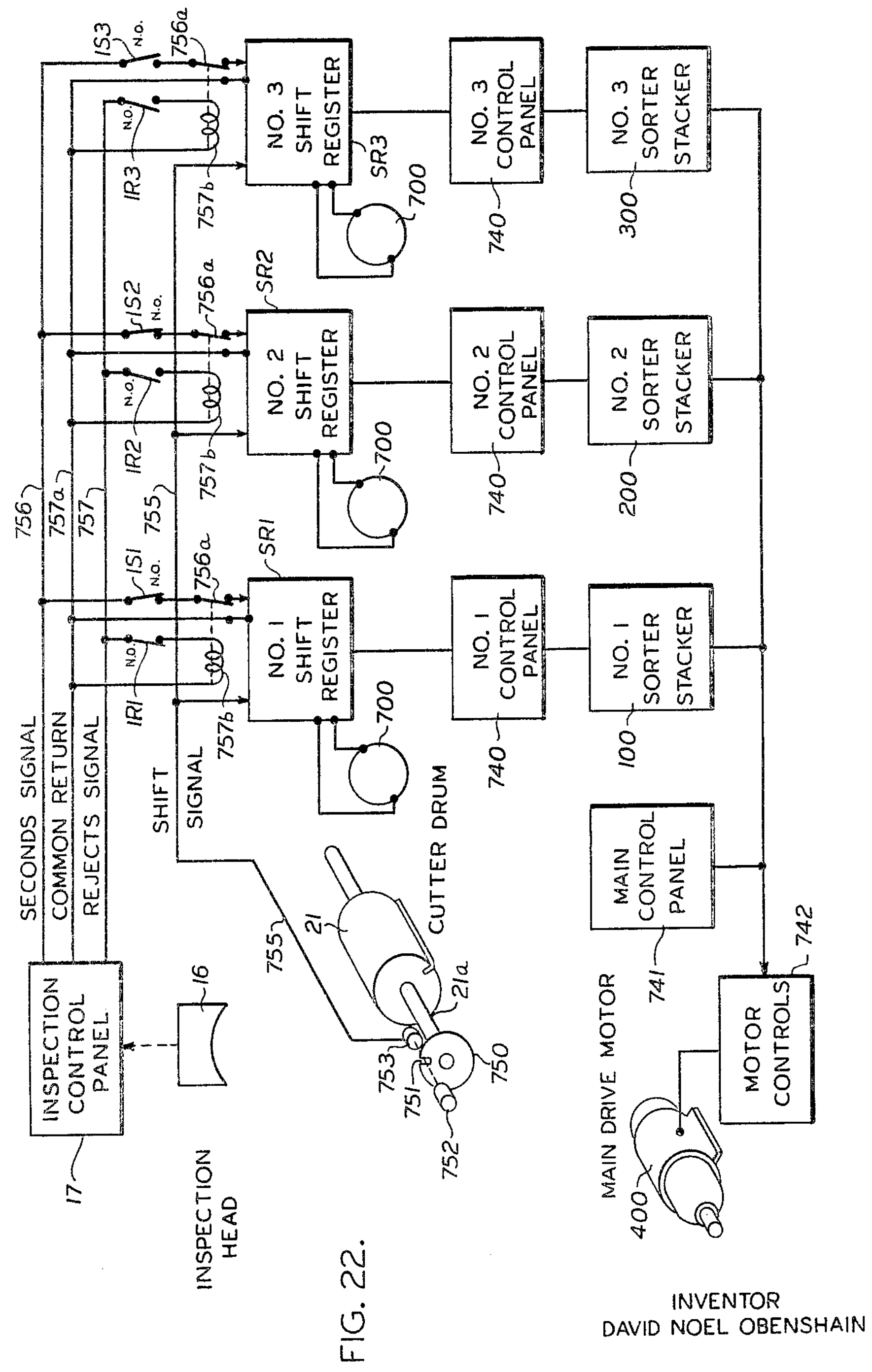
FIGURE 22 is a block diagram of the general control system for the machine.

As shown in FIGURE 22, the inspection control panel 17, controlled from the inspection or scanning head 16, is adapted to develop defect signals ("seconds" or "rejects"), and to transmit the "seconds" signals to shift registers SR1, SR2 and SR3, which are associated, respectively, with the units 100, 200 and 300. Having in mind that the production of a "seconds" signal by the inspection mechanism depends upon the development of a signal exceeding a definite threshold voltage and the production of a "reject" signal by the inspection mechanism depends upon the development of a definite, higher threshold voltage, it will be clear that a "seconds" signal will be produced each time a "reject" signal is produced, but that a "seconds" signal may also be produced without the production of any "reject" signal.

In order to understand the use made of the defect signals, it is necessary to remember also that the unit set to collect "firsts" has its flipper normally up or open, that the unit set to collect "seconds" has its flipper normally down or closed, and that the stand-by unit has its flipper always down. It should also be noted as a rule that no count is made at a sorting station when the flipper at that station stays down, or is shifted down, to refuse acceptance of a sheet. This will be gone into more fully at a subsequent point.

The inspection mechanism is connected to put out "seconds" signals through an electrical conductor 756 which is connectable to the shift registers SR1, SR2 and SR3, respectively, through parallel switches 1S1, 1S2, and 1S3, respectively. The inspection mechanism is connected to put out "reject" signals through an electrical conductor 757 which is connectable through parallel, normally open switches 1R1, 1R2 and 1R3 to a common return conductor 757*a*, in each instance by way of a relay winding 757*b*.

With the unit 200 collecting "firsts," the unit 100 collecting "seconds" and the unit 300 held in reserve, the switches 1S1, 1S2, 1S3, 1R1, 1R2 and 1R3 will be maintained as illustrated in FIGURE 22. Since the switches 1R3 and 1S3 (associated with unit 300) are both open, no defect signal will have effect at any time, and the normally closed flipper 303 will remain down at all times. No sheets will be accepted and there will be no counting at the sorting station of unit 300.

Since the switch 1R2 is open and the switch 1S2 is closed, "reject" signals will never go through switch 1R2 but all "seconds" signals developed will reach shift register SR2. A "seconds" signal which reaches the shift register SR2 will, at the proper time, shift the flipper 203 to closed position where it will automatically remain for a full revolution of collecting drum 204. The "seconds" signal will also suppress the count in unit 200 of the sheet responsible for the signal.

Since the switches 1R1 and 1S1 are both closed, both "seconds" signals and "rejects" signals can be transmitted. If the sheet is a "seconds," the "seconds" signal alone will come through. When the "seconds" signal alone comes through, it causes the flipper 103 to be temporarily shifted at the proper time to the open or receiving position, and it thereby causes a count to be effected. When a "rejects" signal comes through it energizes relay winding 757*b* associated with shift register SR1, thereby opening an associated switch 756*a* and suppressing the transmission of the "seconds" signal, so that no signal reaches the associated unit 100. The flipper 103 remains in its normal, closed position and the sheet goes through to the "reject" chute. No count is effected at the unit 100.

To recapitulate briefly, no defect signal ever reaches the shift register of a unit which is set in standby condition. Only "seconds" signals ever reach the other units. The effect of a "seconds" signal on the "firsts" unit is to lower the flipper and suppress a count. The effect of a "seconds" signal on the "seconds" unit is to raise the flipper and effect a count.

(b) *The shift registers*

Before proceeding with a specific description of the mechanism of FIGURES 24 and 25, shift register SR2 of FIGURE 26 will be explained. This register is typical of all the shift registers, so that a description of one will suffice for all.

Since the inspection station is located some distance ahead of the sorting stations, it is necessary to delay the effect of signals for considerable periods after they are developed by the inspection device. It is desirable, moreover, to maintain a flipper in a condition to which it may have been shifted in response to a signal from a time prior to the arrival of the sheet responsible for the signal at the flipper until after the trailing end of the sheet has passed the acceptance point. The shift register memory device, is a practical and advantageous means for controlling the time of the taking effect of the defect signal in the associated unit.

The shift register SR2 includes commonly known circuits such as pulse squaring circuits, bi-stable multivibrator or flip-flop circuits, monostable multivibrator or one-shot delay circuits and gate circuits which, for the sake of simplicity, will not be described in detail. The designation Z–8318, Z–8342, Z–90001 and Z–90002, appearing on the drawing, are established designations of the Electronic Engineering Company for standard wired units manufactured and sold by it. Since the complete circuitry would be obvious to one skilled in electronics, many details have been omitted.

A "seconds" pulse from the inspection device, when transmitted, is applied to a junction or terminal block J1 and thence to input terminal 2A of a squaring circuit V2.

The output from terminal 2*b* of squaring circuit V2 is fed to input terminal 3*a*, which may be one control grid, of a flip-flop circuit V3 with the flip-flop in its first, or non-signal bearing, stable state. This triggers V3 to its second stable state, the condition being characteristic of the fact that a signal is stored. To trigger flip-flop circuit V3 so as to produce an effective output pulse at terminal 3*b*, a pulse must be applied to terminal 3*d* of V3. This is done as follows.

The shift sync device 750–755 operated by the drive shaft 21*a* of cutter blade 20 (FIGURE 22), causes a pulse to be applied to input terminal 16*a* of squaring circuit V16.

This occurs just as a length of web which is destined to become a sheet completes its transit of the scanning line. To enable this timed relationship to be established for sheets of various lengths, the light 752 and the photoelectric sensor 753 are mounted with capacity for adjustment through 360° about the axis of shaft 21*a*.

The squaring circuit V16, operating similarly to circuit V2, applies a timing pulse from terminal 678 of V16 to terminal 3*d* of flip-flop V3. This last pulse again triggers the flip-flop V3 restoring it to its first stable state and causing a pulse to be transmitted from terminal 3*b* of V3 to terminal 4*a* of one-shot murtivibrator V4.

It is noted that the pulse is applied to terminals 5*d*, 7*d* . . . 15*d* of all the flip-flop circuits V5, V7 . . . V15. Hence successive operations of shift-sync device 750–755, causing successive shift pulses, causes the "seconds" pulse to be shifted from one flip-flop to the next. If a subsequent "seconds" pulse is fed through squaring circuit V2 to flip-flop V3, this "seconds" pulse, as well as the first, will be shifted step by step along the flip-flop circuits V5, V7, V9 . . . V15, by way of one shot circuits V4, V6, V8 . . . V14, all the shifts being effected simultaneously.

If no "seconds" pulse is stored in a given flip-flop device the application of a shift-sync pulse to the *d* terminal of that device will be without effect. The device will remain in its first stable state, receptive to a fresh "seconds" pulse, but will send no "seconds" pulse ahead to the next following flip-flop, so that the following flip-flop will receive no "seconds" pulse at that shift.

It is important that each flip-flop circuit be cleared before a signal from the preceding flip-flop circuit is passed on to it. Each one-shot multivibrator accepts the signal and delays its transmission just long enough to make sure that the next flip-flop will be in a proper signal receiving condition.

The *b* terminals of successive flip-flop circuits, other than V3 and V5, are connected to successive terminals of a manually settable, selector switch SW4. Depending on the setting of switch SW4, then, the output of the shift register SR2 is automatically taken off after any selected number of shift intervals from two to six intervals, the number of intervals corresponding to the number of sheets lying between the sheet just inspected and the sorting point of the sorter-stacker unit with which the shift register is associated. As shown, the output is taken by switch SW4 from flip-flop V7 after three intervals of delay. The outputs of switch SW4 due to the inspection device pulses are applied to terminal 19*d* of a gate circuit V19 to close a switch S1 (FIGURES 25 and 26) through a control relay 660.

If a "seconds" signal has been developed by a given sheet of paper it will reach the terminals 19*d* of the several shift registers precisely at the instant of execution of one or another of the subsequent sheet cutting operations. This timing is common to all the shift registers, although a given "seconds" signal may and will reach the points of utilization, terminals 19*d* of the several shift registers during different cutting cycles, because it will be taken off at different stages in the several registers.

The time of utilization of a signal within a cutting cycle is independently chosen for each shift register, being controlled from the collecting drum shaft of the associated sorter-stacker unit. The several collecting drum shafts may be set to be exactly in phase with one another, that is to say, with their points X in exactly corresponding positions if the units are separated from one another by exactly the length of a collecting drum circumference. If they are not so spaced with relation to one another, the arrows X will necessarily be set out-of-phase with one another, and the timing of the utilization of the signal will be modified accordingly.

A switch S2, controlled from the drive shaft of the associated collecting drum and embodied in the unit 700 of the drum is caused to be closed comfortably in advance of the arrival of the point X at top center position, in time to bring about a change of position of the sorting flipper for the next sheet, if that is required. Closing of the switch S2 transmits a pulse to squaring circuit V17 and this, in turn, applies a square pulse at terminal 19*a* of gates V19. If the gate stands open, by reason of the application of a "seconds" pulse at 19*d*, the pulse from S2 is transmitted from terminal 19*b* to 20*a* of a flip-flop V20. This triggers the flip-flop V20, causing a gate opening impulse to be applied to terminal 1*a* of gate V1.

As a result, current flows continuously through the gate V1, energizing electromagnetic coil 660 and causing a switch R1 to be closed and held closed until flip-flop V20 is triggered back to its original condition, whereupon winding 660 is de-energized.

The closing of the gate V1 is brought about by the closing of a switch S3 which also forms part of the unit 700. Closing of the switch S3 causes an impulse to be applied at 18*a* to squaring circuit V18 and this is transmitted from terminal 18*b* as a square pulse to terminal 20*d* of flip-flop V20.

Should there be no "seconds" signal present at 19*d* during a given cycle, the gate V19 will not be opened, the winding 660 will not be energized, and the switch S1 will not be closed. The alternative consequences of closing switch S1 and of leaving it open will be explained fully at a subsequent point.

(c) *The assignment of duties to the sorter-stacker units*

Figure 28:
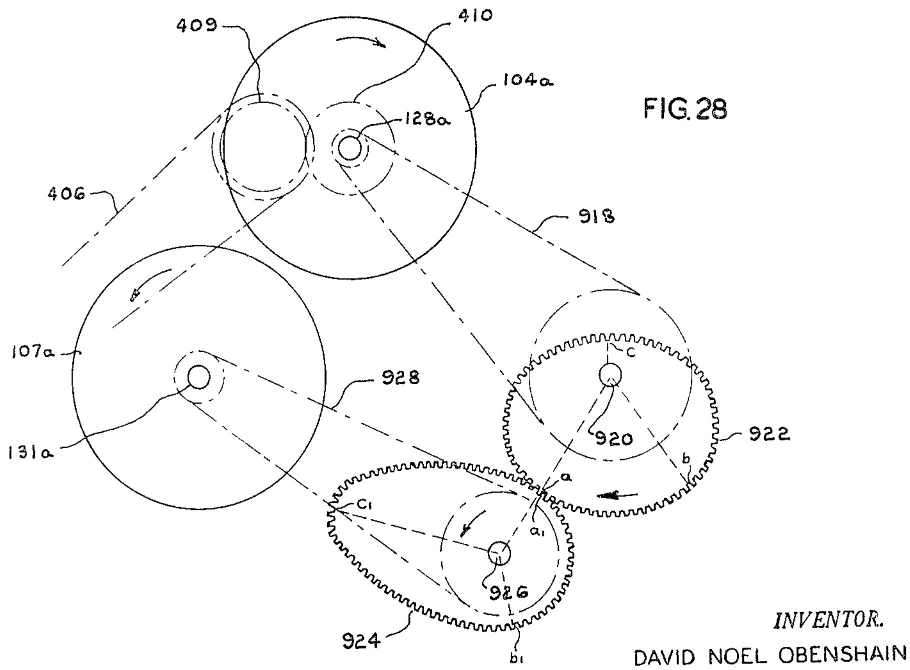
FIGURE 28 is a diagrammatic view of driving means for the single stacker machine.

The settings for assigning specific duties to the respective units are controlled from the master panel 741, the circuits directly affected being illustrated in FIGURE 28. In connection with each unit there are two master switch buttons. So long as neither switch button has been actuated, the associated unit will be maintained in the standby or reserve condition. If one button of the unit is actuated, the unit will be set up for collecting "seconds," and if the other button of the unit is actuated, the unit will be set up for collecting "firsts."

Figure 24:
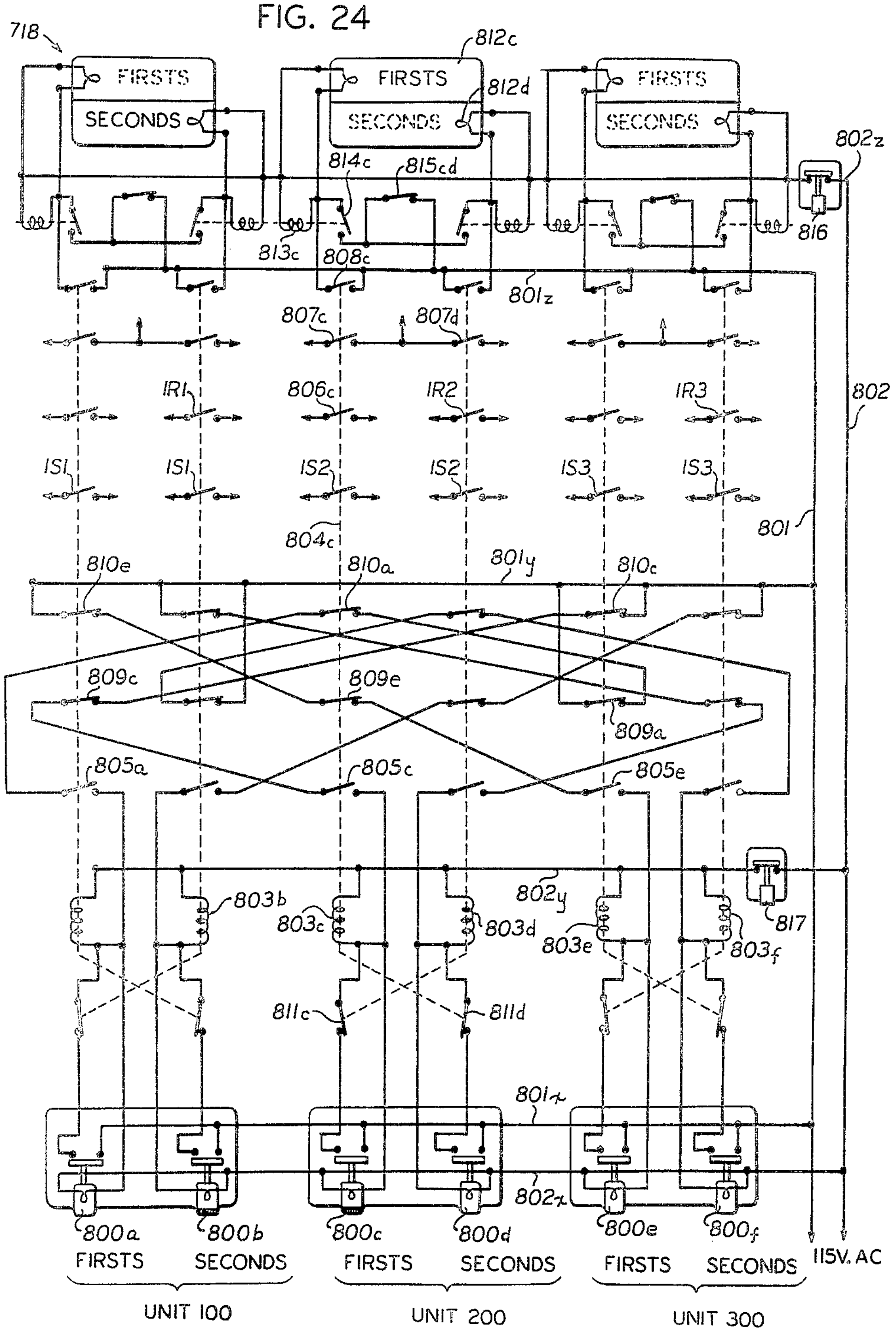
FIGURE 24 is a diagram showing the electrical means for assigning duties to the respective sorter-piler units and for implementing such assignments.

In FIGURE 24 all switches are illustrated in their normal positions for clarity, although two of the buttons are shaded to indicate that they are the buttons which would have to have been actuated in order for the unit 100 to be assigned the duty of collecting "seconds" and the unit 200 to be assigned the duty of collecting "firsts," as is assumed in connection with many of the other figures.

With the circuits in the clear condition illustrated in FIGURE 24, any one of the buttons 800*a*, 800*b*, 800*c*, 800*d*, 800*e* and 800*f*, which is pressed first can take effect, but when one of the "first" buttons, say 800*c* has been pressed, the machine is committed to the collecting of "firsts" by the corresponding unit, in this case unit 200. Pressing of the "seconds" button 800*d*, which is also associated with the unit 200, will then be without effect. If one of the remaining "seconds" buttons, say 800*b*, is next pressed, the machine will be committed to the collection of "seconds" by the involved unit, namely, the unit 100. Pressing of the "firsts" button 800*a* will then be ineffective.

In this condition of the parts, pressing of the "firsts" button 800*e* would immediately supersede the effect of the "firsts" button 800*c*, causing the duty of collecting "firsts" to be taken over by the unit 300. Again, with the buttons 800*b* and 800*c* effective, the pressing of the button 800*f* would immediately supersede the effect of the "seconds" button 800*b*, causing the duty of collecting "seconds" to be taken over by the unit 300.

Since the button pairs for the respective units and the associated circuits are alike for all units a complete description of the showing of FIGURE 24 is not necessary, once the purpose and principle of the circuits has been made clear by an illustrative description of the circuits controlled by button 800*c*.

The current is supplied in FIGURE 24 from A.C. mains 801 and 802, the former including branch conductors 801*x*, 801*y* and 801*z*, and the latter branch conductors 802*x*, 802*y* and 802*z*. The pressing of switch button 800*c* completes a temporary circuit between 801*x* and 802*x* through a light situated in button 800*c*. It also completes holding circuits through a relay winding 803*c* between 801*y* on the one hand and 802*x* and 802*y* on the other, so that the button 800*c* can be released to return to its normal, open position, while the effect of its having been actuated is maintained.

Energization of relay winding 803*c* reverses the normal, illustrated condition of every switch through which the broken line 804*c* extends, closing normally open switches 805*c*, 1S2, 806*c*, 807*c* and 808*c*, and opening normally closed switches 809*e* and 810*a*. It also opens normally closed switch 811*d*, rendering "seconds" button 800*d* ineffective for as long as the winding 803*c* remains energized. The arrangement of the 805, 809 and 810 switches in the *a*, *c* and *e* circuits assures that no one of these circuits may take over the collection of "firsts" for its own unit without first having rendered the other units incapable of collecting "firsts." A similar interlock is provided between the *b*, *d* and *f* circuits with reference to the collecting of "seconds."

Closing of the switch 808*c* completes a circuit between branch conductors 801*z* and 802*z* through an illuminated sign 812*c* which indicates that "firsts" are being collected on the stack of unit 200. The signal 812*c* will remain illuminated as long as the unit 200 continues to collect "firsts," but for the convenience of the workmen it is desirable to continue the illumination until after the sheets have been removed from the stack table, even though the duty of collecting "firsts" may have been taken over by one of the other units and the switch 808*c* may, in consequence, have been opened.

The initial closing of the switch 808*c* completes also a holding circuit through a relay winding 813*c*, a normally open switch 814*c* which is closed by the relay 813*c*, and a normally closed switch 815*cd*. The switch 815*cd* is conditioned by the arrival of the stack table in its lowest position for unloading, to be momentarily opened as the unloaded table starts upward, so that the unloaded table is returned to its uppermost position ready for resumed service with the light 812*c* extinguished. The switch 815*cd* similarly affects the illuminated sign 812*d*.

A normally closed switch 816 in branch conductor 802*z* may be manually opened for temporarily extinguishing all the stack signs. When the switch 816 is allowed to reclose, any signal previously illuminated will be automatically re-illuminated according to the conditions of the 808 switches.

A normally closed switch 817 in branch conductor 802*y* may be manually opened for disabling all sorter-stacker units and thereby sending all sheets to the broke chute in an emergency. After such an interruption of normal operation, the 800 buttons will be required to reset, but the operator may be guided in this by the illuminated signs.

Closing the switch 1S2 by means of relay winding 803*c* establishes the connections to shift register No. 2 which are illustrated in FIGURE 22. Closing switches 1S1 and 1R1 by means of relay winding 803*b* establishes the connections of shift register No. 1 which are illustrated in FIGURE 22. When neither relay 803*e* nor 803*f* is energized, the switches 1S3 and 1R3 both remain open as shown in FIGURE 22.

The closing of switch 806*c* by relay winding 803*c* reverses the normal condition of sorting flipper 203, changing it from the down position to the up position. (See FIGURE 25.) The closing of the switch 807*c* by the relay winding 803*c* conditions the five sheet counter of unit 200 to count those sheets which have not developed a "seconds" signal, but to omit counting those sheets which are associated with a shift register transmitted "seconds" signals. The closing of the switch 807*d* by the relay winding 803*d* (when unit 200 is set to collect "seconds") conditions the five sheet counter of unit 200 to count any sheet which is associated with a shift register transmitted "seconds" signal but not to count any sheet which is not associated with such a signal.

The "seconds" ream flag inserter 671 is normally made responsive to the ream counter 721 through a switch 820*a*. The closing of switch 806*c* energizes a winding 820 and thereby reverses switch 820*a*, causing the "seconds" flag inserter 671 to be disabled and the "firsts" flag inserter 670 to be made responsive to the counter 721.

(d) *The cyclical operation of the sorter-stacker units*

In connection with the description of the shift register, it has been brought out that the relay switch S1 (FIGURE 25) when closed in response to a "seconds" signal, is held closed from the closing of switch S2 to the closing of switch S3. The closing of switch S1, as has been made clear, affects the counting of a sheet by the counter 720. It also affects the acceptance of the sheet by the flipper 203.

Figure 25:
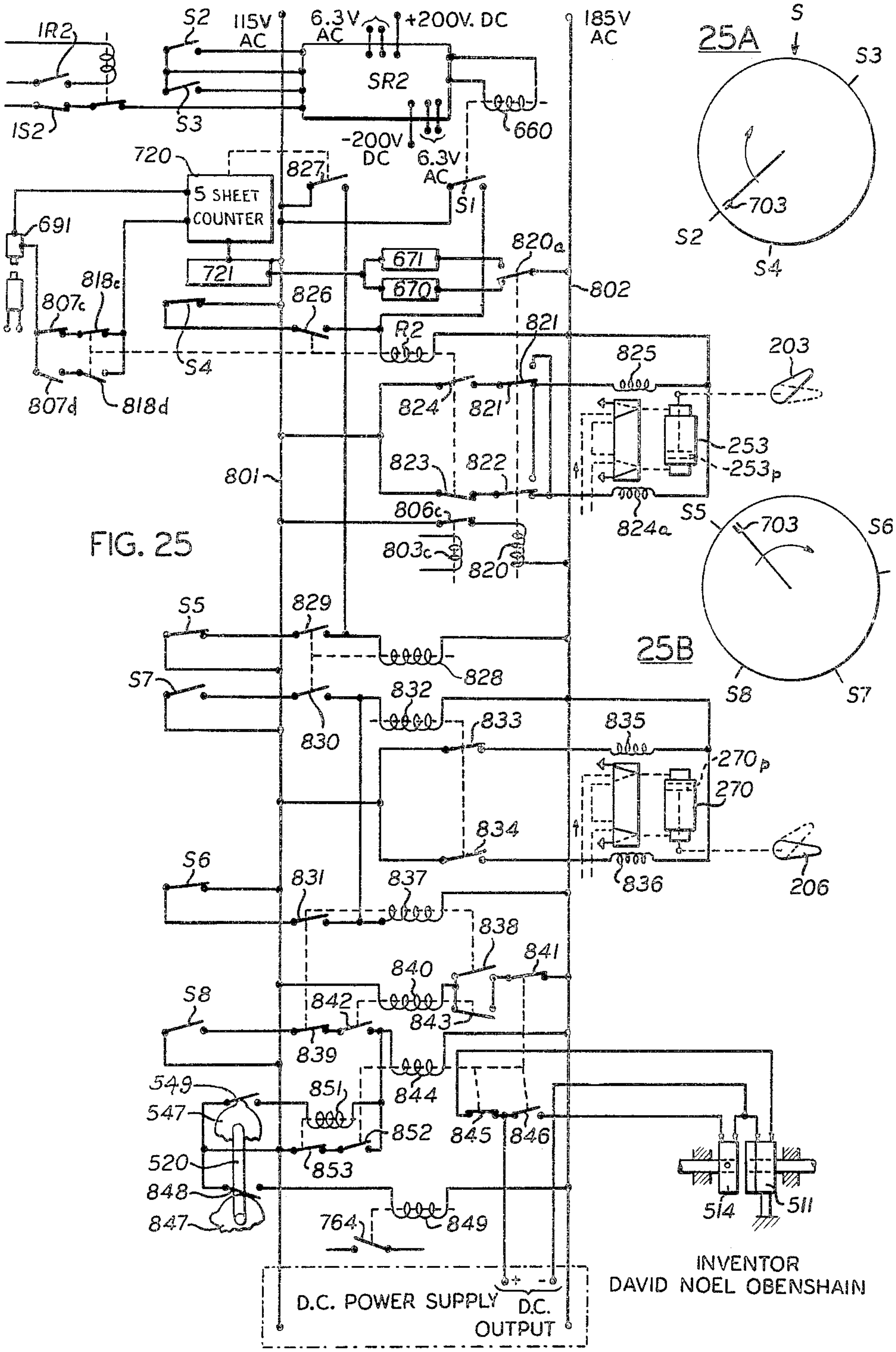
FIGURE 25 is an electrical diagram showing essential circuits involved in a single, typical sorter-piler unit.
Figure 26:
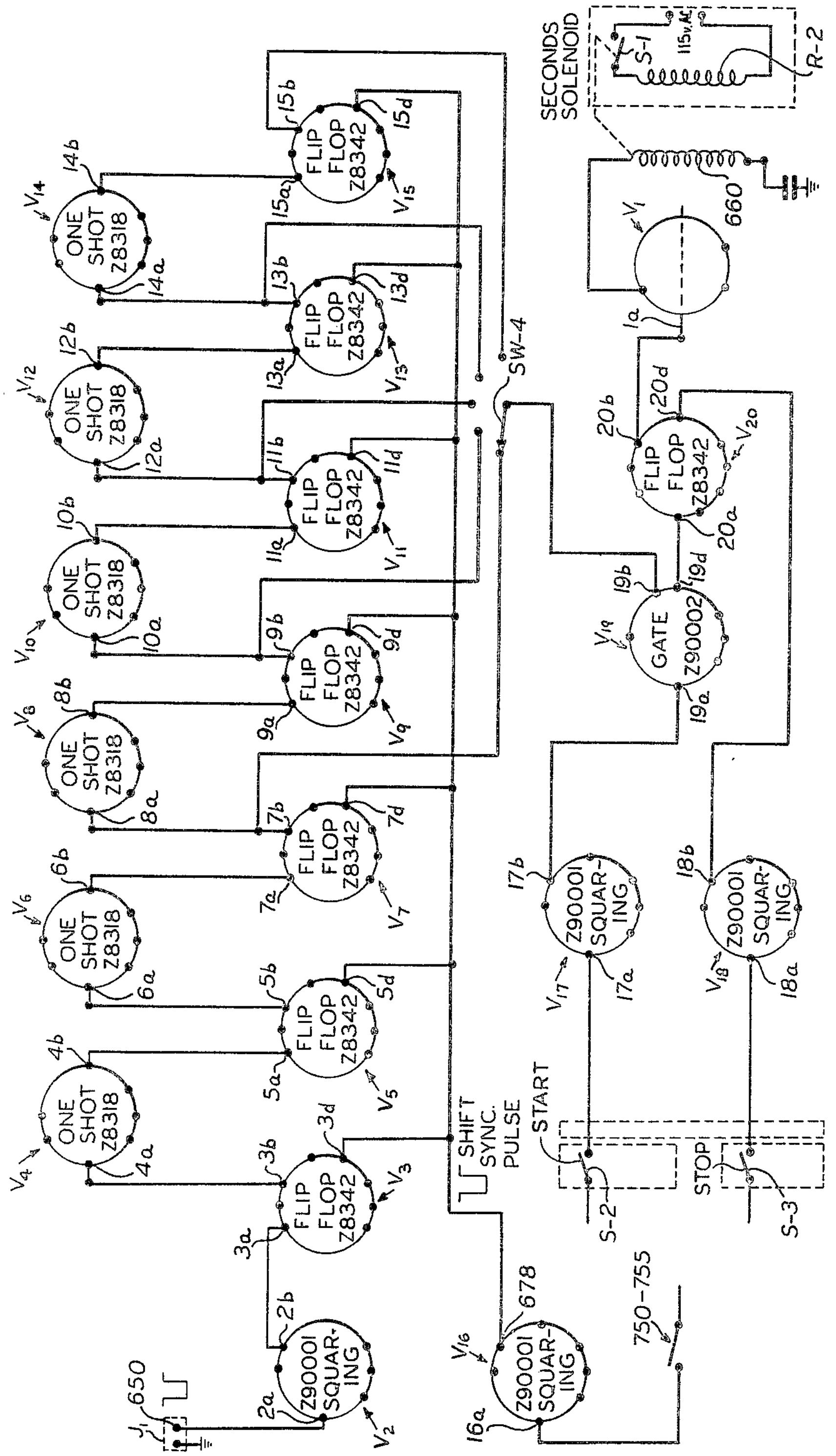
FIGURE 26 is a diagram illustrative in broad outline of a single typical shift register unit.

FIGURE 25 shows comprehensively:

(1) How the "seconds" signals are utilized to cause a unit when assigned the duty of collecting "firsts" to accept and count "firsts" only, and when assigned the duty of collecting "seconds" to accept and count "seconds" only; and (2) How the five count is utilized to cause a unit in which a packet of five sheets is being completed to execute the transfer or the packet from the collecting drum to the transfer drum and to execute a slowdown-recovery cycle of the transfer mechanism.

Switches S2 to S8 are all included in the timer 700 of unit 200 and are responsive to the magnet 703. Since switches S2 and S4 are concerned exclusively with one set of operations, and switches S5 to S8 are concerned exclusively with a distinct set of operations, and the two groups are independent and non-conflicting, the group S2 to S4 will be described in connecting with the diagram marked 25A and the group S5 to S8 will be described in connection with the diagram marked 25B.

Regardless of the setting of unit 200, the switches 818*c* and 818*d* will normally be closed and open, respectively, as illustrated in FIGURE 25. For collecting "firsts," switch 807*c* will be set closed and switch 807*d* will be open. For collecting "seconds," switch 807*c* will be open and switch 807*d* will be set closed. In either case, the arrival of a "firsts" sheet should leave the switches 818*c* and 818*d* undisturbed, while the arrival of a "seconds" sheet should reverse the switches 818*c* and 818*d* for at least long enough to produce or suppress a count as the case may require. Such operation is caused to occur in response to the arrival of a "seconds" signal. Thus, "firsts" only will be counted when the unit is set to collect "firsts," and "seconds" only will be counted when the unit is set to collect "seconds."

Regardless of the setting of unit 200, flipper controlling switches 823 and 824 will be normally closed and open, respectively, as illustrated in FIGURE 25. Flipper controlling switches 821 and 822 will be maintained in their upper closed positions when the unit is set to collect "seconds." Closing of the switch 806*c* by winding 803*c* in response to closing of button 800*c* energizes a winding 820 and thereby shifts the switches 821 and 822 from their normal raised settings to their lower settings, appropriate for the collection of "firsts." In either case, the arrival of a "seconds" signal will reverse switches 823 and 824, and will thereby reverse the flipper.

The switch S2 is located a substantial distance in advance of the point S (FIGURE 17). In cooperation with a "seconds" signal from the inspection head, it may start a flow of energizing current through winding 660 exactly a whole number of cycles later. The energization of winding 660 closes switch S1 and holds it closed to the point at which the switch S3 is located. The switch S3 could be located much nearer to the switch S2 or much farther from it. In fact a mere momentary energization of winding 660 would suffice, because the closing of switch S1 causes energization of winding R2 and the energization of winding R2 is maintained through a holding circuit. The holding circuit includes a normally open switch 826 and normally closed switch S4, and it will persist until the magnet 703 passes switch S4 and momentarily opens the switch. There is a wide latitude as to the location of switch S4 since it is merely required, on the one hand, not to cut off energization of winding R2 and 826 until after the "seconds" count has been transmitted to the counter and, on the other, to cause the de-energization of R2 and the opening of 826 before the magnet 703 again reaches switch S2. At times two "seconds" sheets will come through in succession. In such a case the energization of R2 should be re-established as the magnet passes switch S2, so that the flipper will be retained in its abnormal position for another cycle.

The control of flipper 206 is similar to that of flipper 203, save that the flipper 206 will always be maintained normally in collecting position and the execution of a transfer cycle will be brought about by the completion of a five count in the five sheet counter. Completion of a five count will occur as the leading end of the fifth sheet cuts off the light beam at associated photo-electric sheet sensor 691. Since the illustrative machine may be used to cut sheets which vary in length between 49 inches and about 24.5 inches, the point in the revolution of the magnet 703 at which the five count impulse will develop may vary by as much as seven-sixteenths of a revolution.

In FIGURE 25B the magnet 703 is shown in the position which it would occupy at the development of the five count signal for the longest sheet. For the shortest sheet it might be advanced as much as 158° farther in a clockwise direction at the development of the signal. A normally closed switch S5 is so disposed that it will surely have been passed by the magnet 703 before the development of the five count signal for even the longest sheet. A normally open, transfer-flipper-shifting switch S7 is provided about 90° ahead of the transfer point. A normally closed, transfer flipper restoring switch S6 is provided about 50° ahead of the shifting switch S7. A normally open slowdown starting switch S8 is provided substantially at the transfer point.

At the development of the five count, the trailing end of a four sheet packet coincides with point X (or the position of the magnet 703 as shown in FIGURE 25B). The transfer should be initiated as soon as the leading end of the fifth sheet has been added to the packet and has been carried around to the transfer point. This presents no problem of delay.

At the occurrence of the five count signal, however, the trailing edge of the fifth sheet has yet to travel a distance substantially greater than the circumference of the collecting drum before it will reach the transfer point, and hence the magnet 703 must make considerably more than a full revolution and cross some of the switches more than once before the slowdown-recovery cycle can be started in response to the five count signal.

Upon the development of the five count signal a switch 827 is closed. This energizes a winding 828 which closes a switch 829, thereby completing a holding circuit through the normally closed switch S5. Energization of the winding 828 also closes a switch 830 which is in series with switch S7. The closing of switch 830 has no immediate effect because the switch S7 is open.

The magnet 703 next crosses and momentarily opens normally closed transfer stopping switch S6, but since the circuit of S6 is at this time held open by normally open switch 831, this first opening of S6 is without effect.

The magnet 703 next closes the transfer starting switch S7, thereby completing an energizing circuit through the winding 832. The energization of 832 causes normally open switch 834 to be closed and normally closed switch 833 to be opened. This de-energizes winding 835 and energizes winding 836, setting actuator 270 to cause a shifting of the flipper 206 from the lower collecting position to the raised transfer position as the cross-over of cam 293 next passes the transfer point. The closing of the switch S7 also energizes a winding 837 and thereby establishes a holding circuit through normally closed switch S6 and normally open switch 831. This causes normally open switch 838 to be closed and held closed, and normally closed switch 839 to be opened and held open.

Momentary closing of normally open switch S8 by magnet 703 is without effect in view of the now maintained open condition of normally closed switch 839.

The magnet 703 next passes and momentarily opens switch S5. This de-energizes and disables winding 828, causing switches 829 and 830 to return to their normal, open positions. The winding 832 is not de-energized, however, a circuit being maintained through switches S6, 831 and winding 832.

When the magnet 703 next opens switch S6, winding 837 is de-energized, switch 831 is caused to open, winding 832 becomes de-energized and the switches 833 and 834 are returned to normal, the electro-pneumatic actuator 270 being thereby set to restore the flipper 206 to collecting position at the next crossing of the transfer point by the cross-over of cam 293. The magnet again closes switch S7 after the second opening of S6, but this has no effect because the switch 830 has been opened.

For clearing up the starting of the slowdown-recovery cycle, it is necessary to go back to the first closing of switch S7. It was brought out that this energized winding 837, closing switches 831 and 838 and opening normally closed switch 839. It was not mentioned, however, that the switch 838 is disposed in series circuit with winding 840 and a normally closed switch 841. Closing of switch 838 causes energization of winding 840 and thereby causes closing of normally open switch 842 and of a holding switch 843 which is disposed in series with the winding 840 and in parallel with the switch 838.

With the second opening of switch S6 by the magnet 703, and the consequent de-energization of winding 837, switch 839 is returned to its normal, closed condition. The switch 842 is retained closed, however, because the winding 840 still holds it closed.

With switches 839 and 842 both held closed for the first time, the closing of the switch S8 is effective to energize the winding 844. The energization of winding 844 opens switch 845 for de-energizing the magnetic brake 511, and closes switch 846 for energizing the constantly driven magnetic clutch member 514. This sets the auxiliary drive mechanism into operation, including the cam shaft 520 (FIGURE 10) upon which the cam 547 is carried. The cam 547 as has been explained, permits the switch 549 to be closed as its hump travels away from the switch, thereby continuing the energization of winding 844 for the apppropriate duration of the slowdown-recovery cycle.

The energization of winding 844 opens the normally closed switch 841, thereby de-energizing winding 840 and restoring the switches 842 and 843 to their normal open conditions. The energization of 844 also closes a normally open switch 852 which establishes a temporary holding circuit for winding 844 effective until the closing of switch 549. Upon closing of switch 549 through rotation of the cam 547, a winding 851 is energized, and this opens a normally closed switch 853 for disabling the temporary holding circuit. Continued energization of the winding 844 is thus made to depend exclusively upon the switch 549, and that switch is finally opened by the cam 547, as has been explained.

The cam shaft 520 also carries a cam 847 through which a switch 848 is briefly closed at an appropriate point in the slowdown-recovery cycle for energizing a winding 849 through which stack tamper switch 764 (FIGURE 21) is closed for causing the stack tamper, when set for automatic operation, to move down into stack tamping position and then to return to its normal position as the cam 847 permits the switch to re-open.

MANAGEMENT FEATURES AND MANAGEMENT

FIGURE 22 is a simplified block diagram of certain of the controls for the illustrative three sorter-stacker unit machine. The main control panel 741 contains the controls for starting, stopping and adjusting the speed of the entire machine. The motor control unit 742 contains the direct current supply for the main drive motor 400 and the various circuit breakers, speed regulators and auxiliary devices for operation of the motor.

Each sorter-stacker unit has an operator's control panel 740. These are located on the frames of the respective sorter-stacker units 100, 200 and 300 as shown in FIGURE 1. A typical control panel 740 is shown in FIGURE 23.

At the top of the control panel 740 are located the sheet count indicator 743 and the ream count indicator 744, a zero reset button 745 and a count subtract button 746. The count subtract button 746 is used to subtract from the sheet count when sheets are manually removed from the top of the stack, in order that the ream flags may be inserted at the correct count of sheets. The general machine controls, RUN 774, STOP 775, JOG FORWARD 776, JOG REVERSE 777, and EMERGENCY STOP 778 are located at the left side of the control panel 740. The RUN button 774 and STOP button 775 are illuminated when activated.

The center group of control buttons 800*c*, 800*d*, 817 and 784 on control panel 740 are the sorter controls for the grade of sheets being delivered to the sorter-stacker unit. All are the illuminated type, permitting the operator to tell at a glance the setting of the sorter controls. When initially starting up the machine, all sorter-stacker units are in stand-by condition. All sorting flippers 103, 203 and 303 of the sorter-stacker units 100, 200 and 300 are locked in the down positions, and all sheets go to the broke chute 30.

Before starting the machine the operator presses the FIRSTS button at one sorter-stacker unit and the SECONDS button at another sorter-stacker unit.

In regular operation, when a stack of sheets has reached the desired level, the operator goes to the control panel of the stand-by sorter-stacker unit and presses the proper grade button. Delivery of that grade of sheets is immediately transferred to the stand-by sorter-stacker unit and the sorter-stacker unit of former delivery is transferred to stand-by condition. The operator may then unload the sorter-stacker unit of former delivery and prepare it for accepting transfer from the next sorter-stacker unit having its stack arrive at the desired height, and so on. Thus, unless both the "firsts" and "seconds" stacks reach their proper levels at or near the same time, there would be no occasion for shutting down the machine in order to remove the loaded skids of sheets.

At the right of the control panel 740 are the stack tamper control buttons 760, 761 and 762 whose operation has already been explained in connection with the tamper mechanism.

Also, at the right of control panel 740 are the stack lift or elevator controls 770, 771 and 772. The UP button causes the elevator platform of the particular sorter-stacker unit to rise as long as the button is held. Likewise the DOWN button 771 causes the elevator platform to lower as long as it is held. Pushing the AUTO button 772 places the elevator platform under control of the photoelectric stack height controller 679, as explained earlier in connection with the section entitled, "Stacker Details." The AUTO button 772 is illuminated when in automatic operation. Automatic control is discontinued when either the UP button 770 or the DOWN button 771 is pushed. It may be restored by pushing the AUTO button 772.

At the upper left corner of FIGURE 23 is shown the inspection head 16, the inspection control panel 17, the class selector 718, the shift synchronizer 754, and the shift register signal delay 719. The inspection head 16 continuously observes by photoelectric means the entire web of paper passing around a chrome plated backing roll beneath it. Two distinct types of defects may be observed and independently evaluated by the equipment. These are defects which cause a change in specular reflection such as creases, wrinkles and glossy spots, and defects which cause a change in diffuse reflection such as dark spots, holes, and smudges. Six calibrated dials (not shown) on the inspection control panel 17 are used to set up the "firsts," "seconds" and "rejects" levels.

D.C. MOTOR TRANSFER DRUM DRIVE

Figure 16:
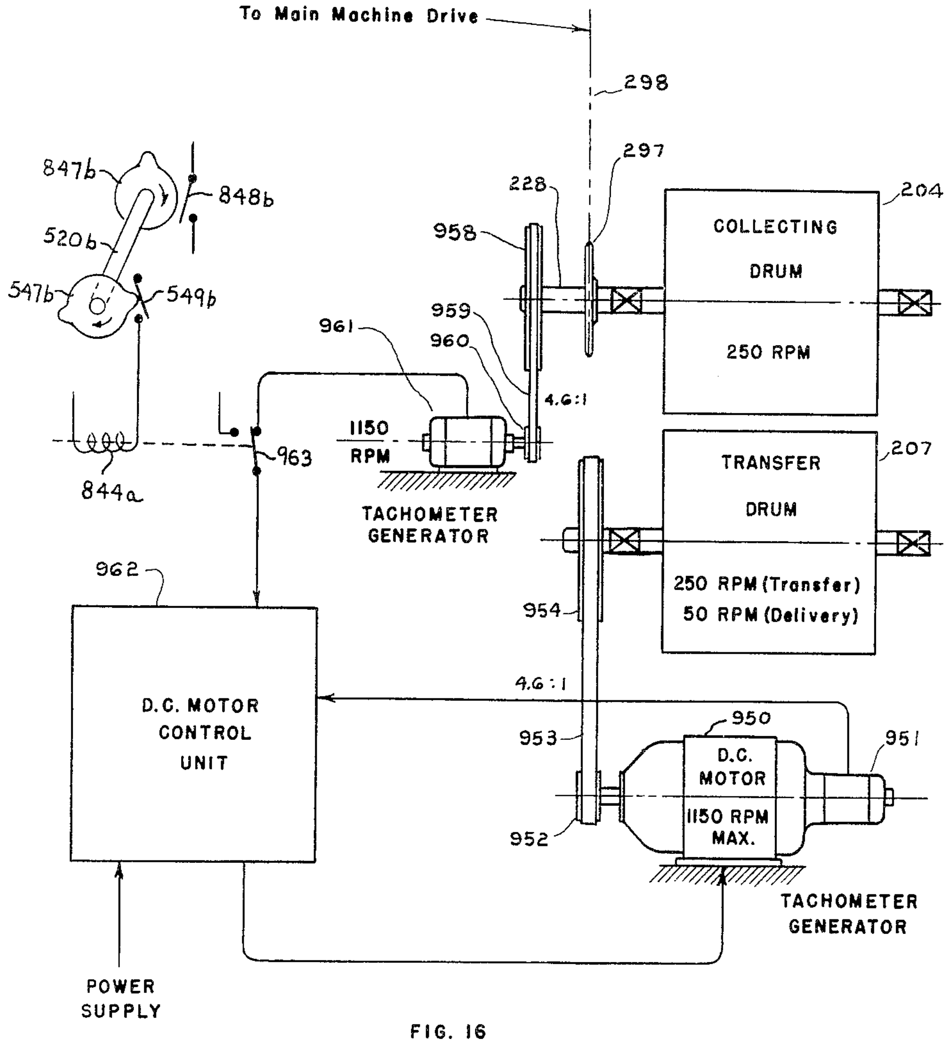
FIGURE 16 is a diagrammatic view of a D.C. motor drive arrangement for the transfer drum, this drive being a modification of that shown in the preferred embodiment.

A modification of the driving means for a transfer drum which I have found to work quite successfully, is illustrated in FIGURE 16. Here the drive for the transfer drum 207 is by means of a variable speed D.C. motor 950. This motor has directly coupled to it, a D.C. tachometer generator 951 whose voltage output is directly proportional to speed. The motor 950 drives the transfer drum 207 at a 4.6:1 ratio by means of timing belt pulley 952, timing belt 953 and timing belt pulley 954. Thus, for example, the transfer drum 207 will run at 250 r.p.m. when motor 950 is running at 1150 r.p.m.

The collecting drum 204 is driven from the main machine drive by means of sprocket 297 and chain 298

(FIGURE 9). Attached to the collecting drum shaft 228 is pulley 958. Belt 959 connects pulley 958 to pulley 960 on a second tachometer generator 961, with a 4.6 to 1 step-up drive. This tachometer generator 961 is identical in output characteristics to tachometer generator 951. Thus, when both tachometer generators 951 and 961 are driven at the same speed, their outputs will be identical. It will be noted that tachometer generator 961 will be running at 1150 r.p.m. when the collecting drum 204 is running 250 r.p.m. Thus, when the collecting drum 204 and the transfer drum 207 are running at the same speed, the outputs of the tachometer generators 951 and 961 will be identical.

The outputs of the two tachometer generators 951 and 961 go to the D.C. motor control unit 962, where they are bucked against each other in a Wheatstone bridge circuit. Connected in the bridge circuit is a sensitive unbalance detector. In case any unbalance is detected, indicating that the two drums are not running at the same speed, the detector causes the D.C. motor controller to modify the current to motor 950 in such manner as to bring the transfer drum 207 back into speed synchronization with collecting drum 204. Since both tachometer generators 951 and 961 will then be running at the same speed, their outputs will be identical and the bridge circuit will be restored to balance. By this action it is possible to drive the collecting drum 204 at any desired machine speed, and transfer drum 207 will assume the same speed. Equipment for this service, and for the further purpose about to be described, is manufactured and sold by Reliance Electric & Engineering Co. of Cleveland, Ohio and is capable of maintaining the speed synchronization within 0.1%, which is quite adequate for this service.

Such equipment comprises a motor, model 25N54A1, with model BC46 tachometer generator attached thereto; a motor control unit designated as V*S power unit, model M/N15V164, mounted in a 2SF cabinet, and a BC46 tachometer generator, foot mounted.

For the slow-down portion of the slow-down-speed-up cycle of the transfer drum, the control may be generally like that of FIGURES 10 and 25, but with the epicycloidal gear train omitted. A cam shaft 520*b*, started by the closing of switch S8, is provided with two humps 180° apart on a cam 547*b*, causing the cam shaft to be turned a half revolution and then to be arrested under the control of a winding 844*a*, and causing a switch 963, also under control of 844*a*, for a corresponding period to shift the connections to the bridge circuit, so that the output of tachometer generator 951 is bucked against a manually adjustable fixed voltage instead of against the output of tachometer generator 961. This fixed voltage is manually adjusted to be the same as tachometer generator 961 when the collecting drum is running at some selected slower speed, for example 50 r.p.m. The transfer drum will then quickly come to this slower speed and remain at this speed until the winding of 844*a* is de-energized by the arrival of the second cam in switch opening position. The transfer drum 207 then returns quickly to the same speed as the collecting drum 204 and continues to run at this speed until another slow-down signal is sent to the D.C. motor control unit 962. Appropriate devices in the D.C. motor control unit 962 limit the deceleration and acceleration to suitable values for the slow-down-speed-up cycle, and also prevent hunting or spurious speed oscillations. This system of driving the transfer drum 207 permits stacking sheets of paper at a constant sheet delivery velocity regardless of the operating speed of the machine.

A modification in the D.C. motor control unit 962 permits having the sheet delivery velocity proportional to machine speed instead of being constant as just described. In this case, for the slow-down cycle, instead of bucking the voltage output of tachometer generator 951 against a fixed voltage, it is bucked against a selected portion of a voltage divider connected across the output of tachometer generator 961. Since the output voltage of tachometer generator 961 is proportional to machine speed, the voltage from the voltage divider, while lower, will still be proportional to machine speed. Thus, the speed of the transfer drum 207 will be lower but will be proportional to machine speed. Speeds and ratios illustrated are typical but in no way are they limitations.

SIMPLE SINGLE STACKER MACHINES

A single stacker machine involving no inspection and no sorting, and employing a single slow-down and stacker unit or two such units for alternative service, would be very useful for many applications. There are considerable advantages in precise single web cutting and stacking at high speed, even if the sheets have to be manually inspected later. For example, all sheets would come from a single web of paper, and the separate operation and waste involved in trimming would be eliminated.

With the need for sorting, and hence the irregular arrival of acceptable sheets, obviated, the transfer and slow-down of the sheets could be programmed through a drive shaft which runs constantly at one-fifth of the rotary speed of the collecting drum and drives the transfer drum through a train which comprises simple, non-linear gearing followed by fixed ratio gearing which has an output-input ratio considerably in excess of one. The non-linear gearing would be designed to produce a regularly recurring slow-down, recovery and constant speed cycle of the driven variable speed gears in each revolution of the drive shaft (five revolutions of the collecting drum). Such a sheeter could be used to considerable advantage in the plant of a paper user who finds it necessary or desirable to purchase paper in roll form, and to cut it into sheets of varied lengths in accordance with his production requirements.

Figure 27:
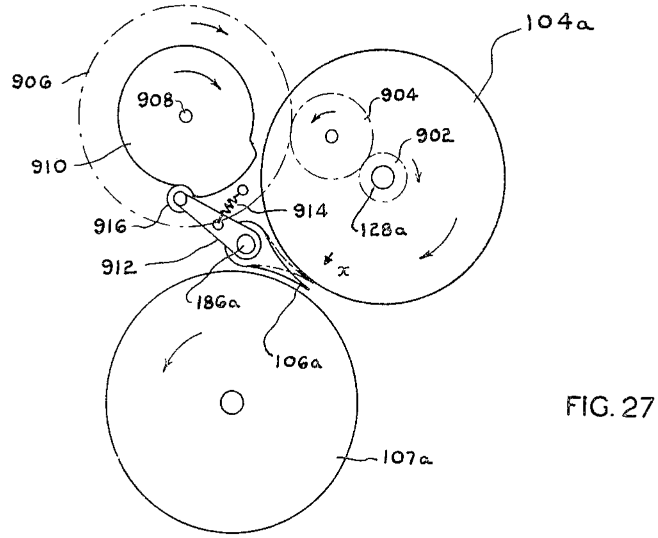
FIGURE 27 is a view in side elevation of collecting and transfer drums of a single stacker machine, constituting an alternative, simpler form of the invention.

A modified machine of the kind last referred to is partially illustrated in FIGURES 27 and 28. The modified machine is desirably like the machine in FIGURE 1 from the beginning through the flying cutter and up to the first sorter-stacker unit, except that there is no inspection mechanism. There is just one sheet collecting, transferring and stacking unit which accepts all sheets. All mechanisms for sorting sheets, for assigning different duties to different units and for controlling the transfer means through a counting of accepted sheets, are omitted.

The collecting drum has no shiftable sorting flipper but has a flipper fixed in the sheet accepting position, as illustrated by sorting flipper 203 in FIGURE 17, for directing all the sheets onto the collecting drum. Tapes, sheet guides, transfer flipper, delivery and stacking equipment are identical to those described in previous sections, and such parts have been given the same numbers with an *a* suffix.

The shaft 128*a* of collecting drum 104*a* is driven as shown in FIGURE 9 by means of chain 406 and gears 409 and 410. A small gear 902, fast on shaft 128*a*, is connected, through an intermediate gear 904, to drive a large gear 906, which is fast on shaft 908, at one-fifth its own rotary speed. The shaft 908 also has fast upon it a flipper operating cam 910. The flipper 106*a* is fast on a rock-shaft 186*a*, which shaft also has fast upon it an operating arm 912. A spring 914, connected to the arm 912 and to a fixed part of the machine frame, yieldingly maintains a follower 916 in engagement with the cam 910.

The follower 916 normally rides upon a small radius concentric portion of cam 910 which extends through 288° (corresponding to four revolutions of the collecting drum) throughout which period the flipper 106*a* is maintained in collecting position. As the point X of collecting drum 104*a* passes the transfer point with the trailing ends of four accumulated sheets on the drum, the high concentric part of the cam 910 which extends through 72° (corresponding to one revolution of the collecting drum)

engages the follower 916, forces the flipper 106*a* into stripping position as indicated by the dotted lines, and maintains said flipper in stripping position for one revolution of the collecting drum 104*a*.

During that one revolution of the collecting drum 104*a*, the transfer drum 107*a* runs at the same rotary speed, and at the same surface speed as the collecting drum 104*a*, but at the conclusion of that one revolution of the collecting drum 104*a*, a slow-down recovery cycle of the transfer drum 107*a* is initiated, which cycle continues through the next four revolutions of the collecting drum 104*a*. The gearing for producing this mode of operation is illustrated in FIGURE 28 in the position which it occupies as the flipper 106*a* is being switched over to stripping position.

The shaft 128*a* is connected through chain gearing 918 to drive a shaft 920 at one-fifth its own rotary speed. An irregular gear 922, fast on shaft 920, variably drives an irregular gear 924, fast on shaft 926.

Radius vectors $a$ and $a_1$ of the gears 922 and 924, respectively, bear the ratio to one another of 5 to 2.72. From alignment of $a$, $a_1$ to alignment of radius vectors $b$, $b_1$ (space of 72° in the rotation of shaft 920 which corresponds to one revolution of collecting drum 104*a*), the radius vectors do not vary, so that the shaft 926 is driven at a uniform speed from shaft 920 in the output-input ratio of 5 to 2.72. The shaft 926, through chain gearing 928, drives the shaft 131*a* of the transfer drum 107*a* in the fixed output-input ratio of 2.72 to 1. For the period of uniform speed now under discussion, this represents an output-input ratio of shaft 131*a* with respect to shaft 920 of five to one, and means that for one revolution of collecting drum 104*a*, the transfer drum 107*a* travels at the same rotary speed as collecting drum 104*a* but in the opposite direction of rotation.

From alignment of $b$, $b_1$ to alignment of $c$, $c_1$ the output-input ratio of shaft 926 to shaft 920 is progressively and smoothly diminished from 5 to 2.72 to one-sixth of that ratio, so that the transfer drum 107*a* at alignment of $c$, $c_1$ is traveling at a minimum speed equal to one-sixth of the constant speed of the collecting drum 104*a*. This occurs through 144° of rotation of shaft 920, or two revolutions of collecting drum 104*a*, and produces a rotation of 310° of transfer drum 107*a*.

From alignment of $c$, $c_1$ to alignment of $a$, $a_1$ the shaft 920 turns through a further 144°, or two revolutions of collecting drum 104*a*, completing the cycle. During this period, the transfer drum 107*a* rotates 310° and increases in speed smoothly and progressively until the surface speed of transfer drum 107*a* is once more equal to the surface speed of collecting drum 104*a*.

It will be noted that while the collecting drum 104*a* makes five revolutions and the shaft 920 makes one revolution, the shaft 131*a* is required to travel a total of 980° or 2.72 revolutions. It should also be noted that the gears 922 and 924 have the same pitch circumference, and that the aligned radius vectors invariably add up to a total length equal to the length of the line of centers.

A further embodiment of a simple single stacker machine is shown in FIGURES 29–35. The transfer drum has been replaced by a slow-down tape system which provides a programmed slow-down similar to that of the transfer drum in the previous description, and is unlike other known tape systems which do not provide a positive programmed slow-down wherein positive control over the sheets is maintained at all times until the sheets are deposited on the stack. While this embodiment shows means for inspection and sorting, it is readily apparent that an even simpler machine which would not include these features, could be provided.

Figure 30:
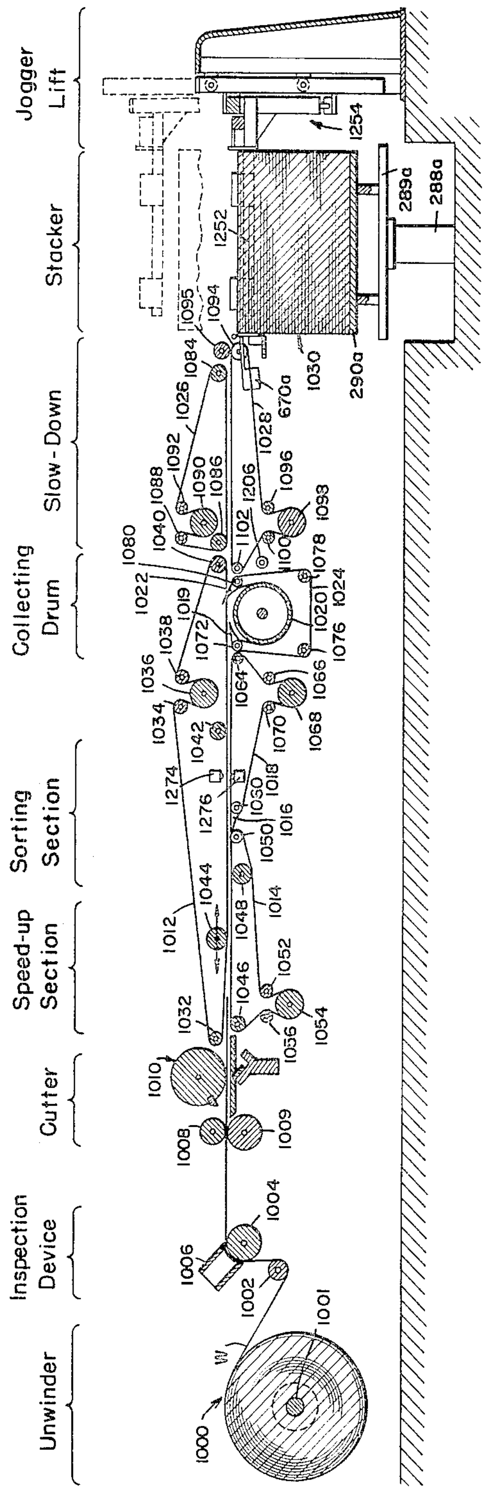
FIGURE 30 is a view in sectional side elevation taken on line A—A of FIGURE 29 and showing a comprehensive view of the FIGURE 29 embodiment of the invention.

In FIGURE 30 it can be seen that a roll of paper is placed in an unwinder 1000 with the web W moving therefrom at high speed around tension roll 1002, over inspection roll 1004 where it is viewed by inspection device 1006, through feed rolls 1008 and 1009, and to rotary sheet cutter unit 1010 where it is cut into sheets. Each sheet then travels between tapes 1012 and 1014 to sorting flippers 1016 where it is either accepted or rejected. Accepted sheets continue in travel between tapes 1012 and 1018, over guides 1019, to collecting drum 1020, similar in all respects to previously described drums 101, 201, and 301. At the collecting drum 1020, the accepted sheets are directed onto the drum 1020 by flippers 1022 and are held against drum 1020 by tapes 1024. Four sheets are collected on drum 1020, and as the fifth sheet approaches the drum 1020, the transfer flippers 1022 move to their stripping position, stripping the four sheets off the drum 1020 which together with the fifth sheet, form an even packet of five sheets. This packet is delivered by tapes 1012 and 1024 to tapes 1026 and 1028, which tapes go through a slow-down-speed-up cycle, first slowing down to deliver the packet of sheets to stack 1030, and then speeding back up to the same speed as the collecting drum in time to accept the next five sheet packet.

Tapes 1012 are carried on rolls 1032 to 1044, including tape drive roll 1036. Nip roll 1044 is adjustable in the direction of the arrows passing through it in similar fashion to roll 50 (FIGURE 2). Tapes 1014 pass over rolls 1046, 1048, around pulleys 1050 carried on shaft 1051, and around roll 1052, drive roll 1054, and roll 1056. Tapes 1018 pass around pulleys 1060 carried on the shaft 1062 of sorting flippers 1016, then around rolls 1064 to 1070, including drive roll 1068. Tapes 1024 pass around pulleys 1072 carried on shaft 1074, rolls 1076 and 1078, around pulleys 1080 carried on shaft 1082 of flippers 1022, and around collecting drum 1020 back to pulleys 1072. Tapes 1026 are carried on rolls 1084 to 1092, including drive roll 1090, and tapes 1028 are carried on rolls 1094 to 1102, including drive roll 1098.

All tape runs have provisions for take-up adjustment, which is accomplished for tape 1014, for example, by moving rolls 1052 and 1056, located before and after tape drive roll 1054, towards each other or apart as required. Rolls similar to 1052 and 1056 are placed before and after each tape drive roll for each tape run for take-up purposes. It is to be noted that all tapes run at the same surface speed as collecting drum 1020.

Figure 29:
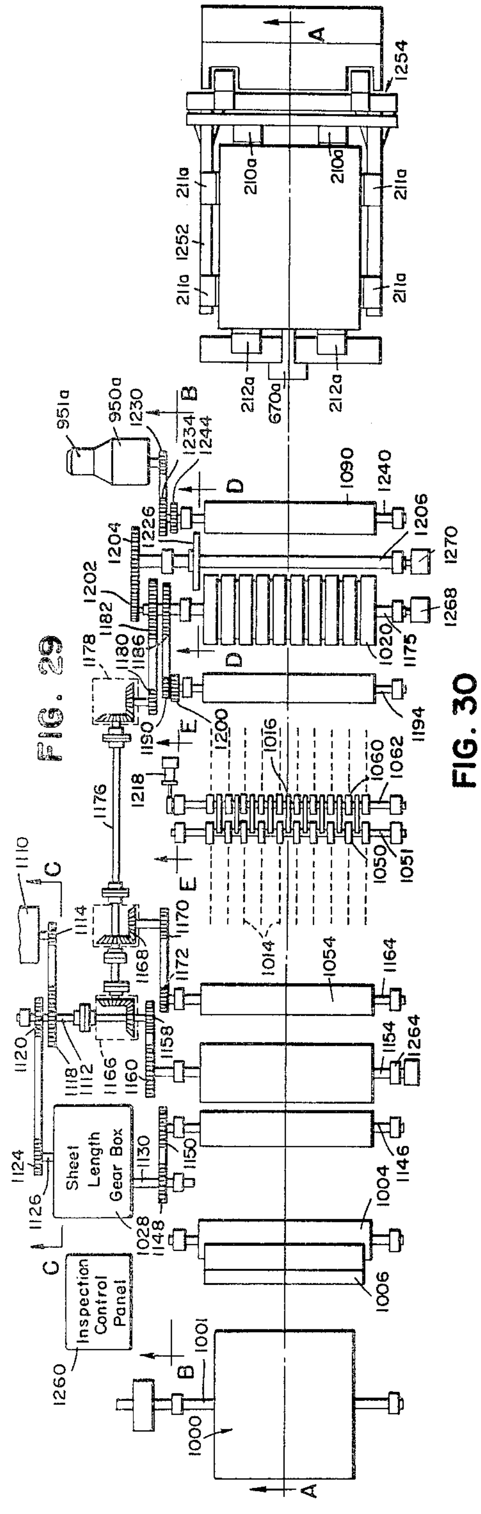
FIGURE 29 is a diagrammatic plan view of a single stacker machine constituting another alternative, simpler form of the invention.
Figure 32:
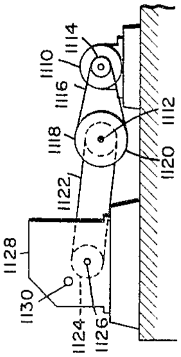
FIGURE 32 is a sectional view of the drive mechanism taken on line C—C of FIGURE 29.
Figure 31:
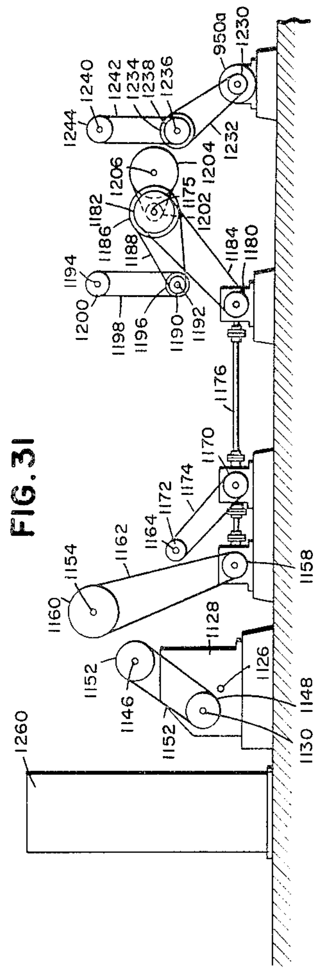
FIGURE 31 is a sectional view taken on line B—B of FIGURE 29 and showing the general drive arrangement for the FIGURE 29 embodiment of the invention.

The main machine drives and tape drives are shown in FIGURES 29, 31, and 32. Motor 1110, similar in all respects to motor 400, FIGURE 9, drives jack shaft 1112 by means of pulley 1114, timing belt 1116, and pulley 1118. Pulley 1120 mounted on shaft 1112, together with timing belt 1122 and pulley 1124, drives input shaft 1126 of the drive unit 1128, similar in all respects to unit 415 of FIGURE 9. Shaft 1146 of feed roll 1009 is driven from the output shaft 1130 of drive unit 1128 by means of pulleys 1148 and 1150, and timing belt 1152.

Returning to jack shaft 1112, it may be seen that jack shaft 1112 drives shaft 1154 of cutter drum 1010 by means of coupled shaft 1156, pulleys 1158 and 1160, and timing belt 1162. Jack shaft 1112 also drives shaft 1164 of tape drive roll 1054 by means of bevel gear units 1166 and 1168 and associated shafts, pulleys 1170 and 1172, and timing belt 1174. Jack shaft 1112 also drives shaft 1175 of collecting drum 1020 by means of bevel gear units 1166 and 1168 and associated shafts, line shaft 1176, bevel gear unit 1178 and associated shafts, pulleys 1180 and 1182, and timing belt 1184. Mounted on shaft 1175 of collecting drum 1020 is pulley 1186 which with timing belt 1188 and pulley 1190, drives shaft 1192 of tape drive roll 1068, which in turn drives shaft 1194 of tape drive roll 1036 by means of pulley 1196, timing belt 1198, and pulley 1200.

Also mounted on shaft 1175 of collecting drum 1020 is pulley 1202 which drives pulley 1204 mounted on cam shaft 1206 in a 5 to 1 ratio by means of timing belt 1208.

It will be noted that the cutter drum and the collecting drum will be driven in a 1 to 1 ratio so that the collecting drum makes one revolution for every revolution of the cutter drum. The drives as shown are purely illustrative and obviously are subject to many variations.

Figures 33, 34:
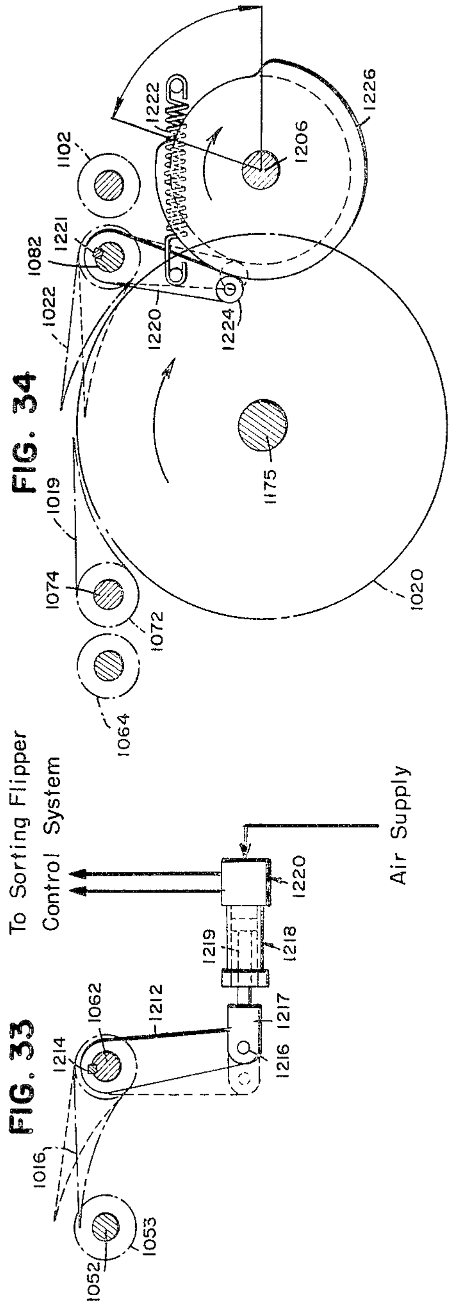
FIGURE 33 is a diagrammatic view of the sorting flipper and its actuating mechanism.
FIGURE 34 is a diagrammatic view of the transfer actuator mechanism.

As the cut sheets travel away from the rotary cutter 1010, they may be taken, if defective, from the line of travel by sorting flippers 1016 being in their up position, as indicated by the dotted lines in FIGURE 33. The sorting flippers 1016 operate ahead of collecting drum 1020, so that rejects sheets never reach the collecting station.

Sorting flippers 1016 are constructed and arranged on shaft 1062 in similar fashion to sorting flippers 203 mounted on shaft 245 as shown in FIGURE 6 and previously described, with the exception that only one tape pulley 1060 is provided in the present case between individual flippers 1016, as best seen in FIGURE 29. Referring now to FIGURE 33, flippers 1016 are mounted on rockable shaft 1062 by set screws (not shown). Shaft 1062 has rigidly attached to it arm 1212 secured by key 1214. Arm 1212 is connected by pin 1216 to the clevice 1217 of a pneumatic cylinder assembly 1218, which supplies power for moving the flippers 1016 between their up and down positions. Associated with pneumatic cylinder assembly 1218 is solenoid valve 1220 which is actuated at the proper time to control the movement of piston 1219 within cylinder assembly 1218 and thereby control the position of sorting flippers 1016. The sorting flippers 1016 are normally in their down or closed position, disposed between tape pulleys 1053 mounted on shaft 1052. When a rejects sheet comes along, the sorting flippers rise up at the proper time to remove the rejects sheet, or sheets as the case may be, and direct them to a broke hatch, broke cart, or some other suitable receptacle.

Transfer flippers 1022 operate to direct accepted sheets onto collecting drum 1020 in similar fashion to flippers 103 (FIGURE 17). Transfer flippers 1022 also, in their down or stripping position as indicated by the dotted lines in FIGURE 34, strip the collected sheets from collecting drum 1020 at the proper time by riding in the grooves of drum 1020. Transfer flippers 1022 are constructed and mounted on shaft 1082, similar to sorting flippers 1016. Cam arm 1220 is rigidly attached to shaft 1082 by means of key 1221. A spring 1222, connected to cam arm 1220 and to a fixed part of the machine frame, yieldingly maintains a cam follower 1224 in engagement with cam 1226.

The cam follower 1224 normally rides upon the cylindrical portion of cam 1226 which extends through 288° (corresponding to four revolutions of the collecting drum) throughout which period the flippers 1022 are maintained in their collecting or up position. Upon the fifth revolution of the collecting drum, cam follower 1224 is maintained against the low concentric part of cam 1226 which extends through 72° (corresponding to one revolution of the collecting drum) throughout which period of the flippers 1022 are maintained in the stripping or down position as indicated by the dotted lines. The sheets on the collecting drum 1020 are stripped from the drum during that one revolution of the drum and are carried by tapes 1024 and 1012 to tapes 1026 and 1028 which go through the slow-down-speed-up cycle.

It is to be noted that during normal operation, if all sheets coming from the cutter are of acceptable quality, four successive sheets will pass over guides 1019 (similar in all respects to guides 202, FIGURE 17) and will be directed onto the collecting drum 1020 by transfer flippers 1022 and held on the drum by tapes 1024. Due to the nature of the gearing between the collecting drum shaft 1175 and cam shaft 1206, i.e. cam shaft 1206 turns one revolution for every five revolutions of collecting drum shaft 1175 as previously mentioned, cam 1226 turns once for every five revolutions of collecting drum 1020. As cam 1226 goes through ⅘ of a revolution, four successive acceptable sheets are directed by transfer flippers 1022 onto collecting drum 1020. During the next ⅕ revolution of cam 1226, the cam follower 1224 engages the low area of cam 1226, transferring the transfer flippers 1022 into stripping position for a full revolution of collecting drum 1020. A fifth sheet approaching collecting drum 1020 is not directed onto the collecting drum because the transfer flippers 1022 are in their down position stripping the previously collected four sheets from collecting drum 1020. This means that the leading edge of the fifth sheet merely registers with the leading edge of the four sheet packet being stripped from collecting drum 1020, forming a packet of five sheets which is delivered by tapes 1024 and 1012 to the slow-down-speed-up tapes 1026 and 1028, the operation of which will be described later. With the gearing arrangement as previously shown and described, a transfer of sheets from the collecting drum will occur every fifth revolution of the collecting drum, and thus the number of sheets in the packet which is stripped from collecting drum 1020 by transfer flippers 1022 may vary from zero to four, depending upon the number of defective sheets, if any, taken from the line of travel before the collecting drum by sorting flippers 1016.

Returning to FIGURES 29 and 30, it is seen that after leaving the collecting drum 1020, the packet of accepted sheets is carried by slow-down-speed-up tapes 1026 and 1028. Motor **950*a* (FIGURE 29) is a variable speed D.C. motor and is identical to motor 950, FIGURE 16, and operates in the identical fashion as previously described for motor 950, except that instead of driving a transfer drum, motor 950*a* drives tape drive rolls 1090 and 1098 of tapes 1026 and 1028, respectively. Motor 950*a* has directly coupled to it a D.C. tachometer generator 951*a*, similar in all respects to a tachometer generator 951, FIGURE 16, whose voltage output is directly proportional to speed. The remainder of the slow-down motor controls are identical to those previously described in connection with FIGURE 16, and, thus, the sheet delivery velocity may be proportional to machine speed or may be kept constant, depending upon whether the voltage output from tachometer generator 951*a* is bucked against a fixed voltage or against a selected portion of a voltage divider connected across the output of a tachometer generator (not shown, but similar in all respects to tachometer generator 961**, FIGURE 16) associated with the collecting drum.

From FIGURES 29 and 31, it is seen that motor **950*a* drives tape drive roll 1098 by means of pulley 1230, timing belt 1232 and pulley 1234 which is fast on shaft 1236 of tape drive roll 1098. Also mounted on shaft 1236 is pulley 1238 which drives shaft 1240 of tape drive roll 1098 by means of timing belt 2142 and pulley 1244 which is fast on shaft 1240. Thus, as motor 951*a* goes through its slow-down-speed-up cycle, tapes 1026 and 1028 are driven through a slow-down-speed-up cycle by tape drive rolls 1090 and 1098. The timing of the slow-down cycle is such that the packet of sheets is taken by tapes 1026 and 1028 at the speed of the collecting drum 1020, and as soon as the packet is clear of the collecting drum 1020, the slow down of the tapes 1026 and 1028 begins, and the tapes attain a minimum speed equal to about 15% of their original speed just as the packet contacts back joggers 210*a*. The sheet packet, after passing under rubber rollers 1095, is deposited on stack 1030, and the tapes 1026 and 1028 are then accelerated to the speed of the collecting drum 1020**, ready to accept the next packet as soon as it has been collected.

The stacker details are similar to those previously disclosed in connection with FIGURES 1, 3, and 17 and consists in general of hydraulic stack elevator **288*a*, platform 289*a*, stacking skid 290*a*, joggers 210*a*, 211*a*, 212*a*, ream flag inserter 670*a* and stack height controller (not shown). Two additional features may be provided and are illustrated in FIGURE 30. The stack elevator 288*a* may be lowered into the floor to permit the building of stacks higher than the paper line height of the machine and to facilitate the removal of a filled skid. Also, the jogger rail 1252** is shown equipped with an elevating mechanism, indicated generally as 1254, which is employed to raise the jogger rail (dotted lines) for removal of a filled skid when the stack height exceeds the paper line height of the machine.

Figure 35:
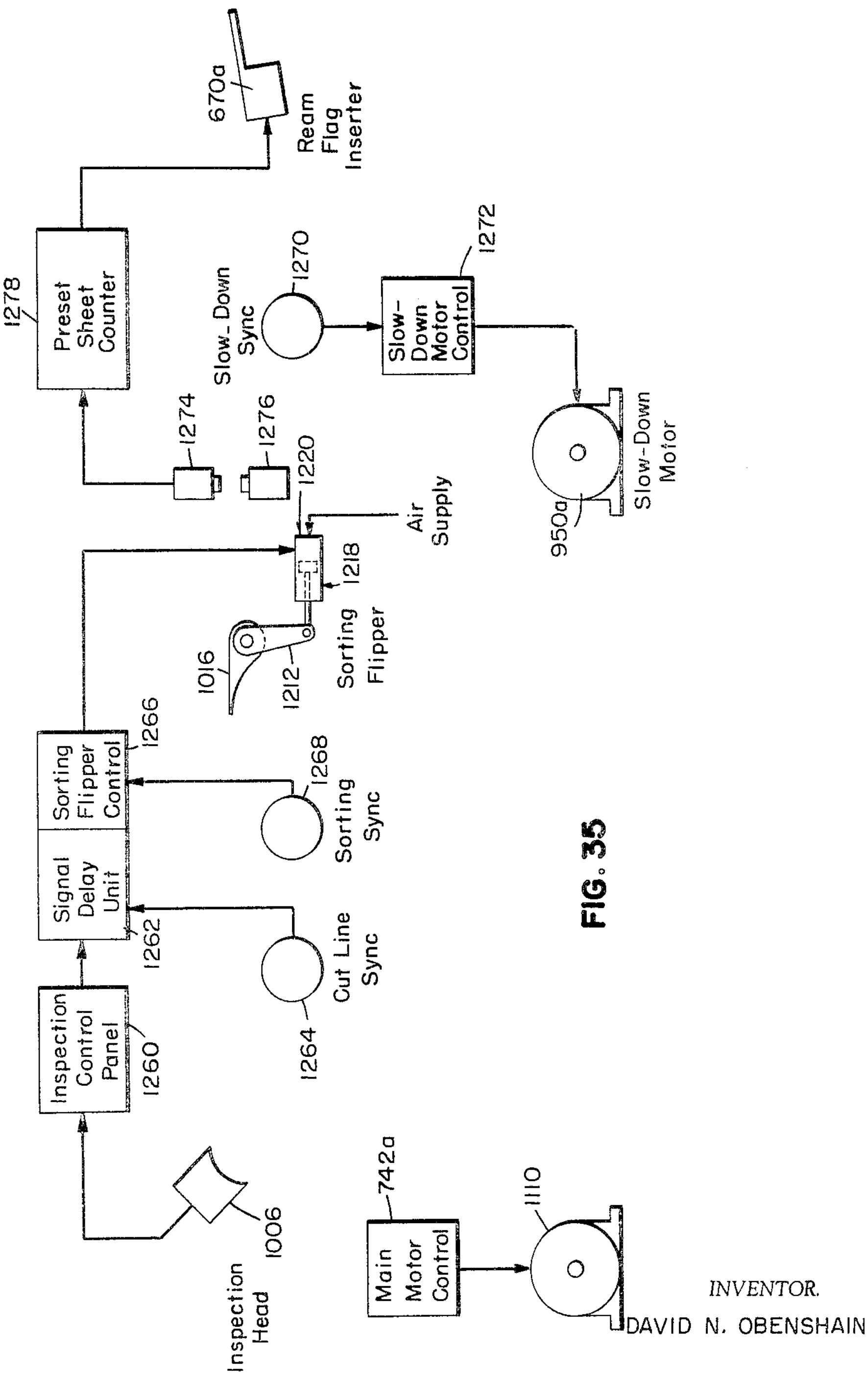
FIGURE 35 is a block diagram of the control system for the FIGURE 29 embodiment of this invention.

Referring now to FIGURE 35, it is seen that the inspection head 1006 scans the web for defects and sends signals to the inspection control panel 1260 which in turn sends rejects signals to the shift register signal delay unit 1262 when the limits set within the inspection control panel 1260 are exceeded. It is to be noted that the inspection head 1006, inspection control panel 1260, shift register signal delay unit 1262 and the main motor controls 742*a* are identical with those previously described in connection with FIGURE 22. A cut line synchronizer 1264, located on shaft 1154 of cutter drum 1010, sends out line signals to the signal delay unit 1262 and causes the shifting of rejects signals from one storage section to the next within the unit 1262. Rejects signals from the signal delay unit 1262 reach the sorting flipper control unit 1266 before the defective sheet responsible for the rejects signal reaches sorting flippers 1016. The rejects signal is held at the sorting flipper control 1266 until the sorting synchronizer 1268, located on shaft 1175 of collecting drum 1020, indicates that the trailing edge of the sheet preceding the defective sheet has passed over sorting flippers 1016. The sorting flipper control unit 1266 then actuates solenoid valve 1220 associated with pneumatic cylinder 1218, allowing air to enter the pneumatic cylinder 1218 and move sorting flippers 1016 to their up or sorting position. The defective sheet is then directed by the sorting flippers 1016 into a receptacle for defective sheets. If the next sheet is a firsts sheet, the sorting synchronizer 1268 sends no signal to the sorting flipper control unit 1266, and sorting flippers 1016 are returned to their down or closed position. The sorting synchronizer 1268 will continue to send rejects signals to the sorting flipper control unit 1266 if successive rejects sheets come along, and the sorting flippers 1016 will be maintained in their up or sorting position until an acceptable sheet approaches.

A slow-down synchronizer 1270, located on cam shaft 1206, is responsible for actuating the slow-down-speed-up cycle. By means of appropriate switches (not shown), the slow-down synchronizer 1270 sends signals to the D.C. motor control unit 1272, similar in all respects to unit 962, FIGURE 16, to initiate the slow-down and speed-up of D.C. motor 950*a*. The D.C. motor 950*a*. then drives tapes 1026 and 1028 through their slow-down-speed-up cycle. It is to be noted that the slow-down-speed-up cycle is identical with that previously described in connection with FIGURE 16, the only difference being that tapes 1026 and 1028 are substituted for the transfer drum, and the slowdown synchronizer 1270 takes over the function of switch 549*b*. All synchronizers referred to above are identical to the shift sync unit 750–755, described in connection with FIGURE 22.

A sheet counting system is provided and consists of photocell 1274, photo-lamp 1276 and sheet counter 1278. Each sheet passing sorting flippers 1016 intercepts the light beam from lamp 1274, and each interception advances the sheet counter one count until the 500 count (one ream) is reached. The sheet counter 1276 resets itself and 5 counts later produces an actuation signal for the ream flag inserter 670*a*, which inserts the ream flag on top of the packet containing the 500th sheet. After several more deliveries are made, the flag is cut loose. This means that the ream flag may be inserted at a point where there are more than 500 sheets, as when, due to rejects, the stacking skid contains 499 sheets, and the next packet delivered to the skid contains 5 sheets, making a total of 504 sheets, which for most purposes will be acceptable practice. However, where it is imperative that exact ream counts be maintained, the sheet counter may initiate a rejection of all sheets after the 500th sheet and until a delivery is made.

SUMMARY

From the foregoing specification, it can be seen that my invention makes possible a radical departure from the conventional method of sheeting and processing of the sheeted paper prior to shipping. It makes possible a better, more uniform product, a reduction in space and manpower required, and an overall saving in cost.

While certain preferred embodiments of the invention have been illustrated and described in detail, it is to be understood that many variations and modifications could be made by one versed in the art all within the scope of the invention.

Furthermore, while the description has referred principally to sheets of paper, sheets of various other materials such as plastics, metal foils, etc., may be handled by the invention in like manner.

I claim:

1. The method of inspecting, cutting, sorting and delivering sheets of paper which comprises, in combination, advancing a single web of paper at constant speed successively past an inspection station and a sheet cutting station, scanning each sheet length of the web as it passes the inspection station to determine the quality thereof while developing classification signals characteristic of any significant defects, cutting successive sheets of predetermined, uniform length from the leading end of the traveling web at the cutting station, continuing the advance of the sheets at undiminished speed along a path which includes a plurality of sorting stations, separating the sheets of first quality at one sorting station, separating the sheets of second quality at another sorting station, conveying the separated sheets at high velocity away from each sorting station to sheet stacking tables associated with the respective sorting stations, and smoothly and progressively slowing down the separated sheets to a relatively low velocity as the sheets advance across a sheet stacking table.

2. The method of inspecting, cutting, sorting and delivering sheets of paper which comprises, in combination, advancing at constant speed a single web of paper past an inspection station and a sheet cutting station, determining the quality of each sheet length as it passes the inspection station, cutting successive sheets of predetermined, uniform length from the leading end of the web at the cutting station, increasing the speed of each cut sheet to a predetermined collecting speed, continuing the advance of the sheets at the collecting speed along a path which includes a plurality of sorting stations, separating the sheets of first quality at one sorting station, and separating the sheets of second quality at another sorting station, while at each sorting station collecting the separated sheets in a registered packet until a packet composed of a predetermined number of sheets has been accumulated, then delivering the packet from each sorting station at undiminished speed for at least a packet length to sheet stacking platforms associated with the respective sorting stations, and smoothly and progressively slowing down the packet to a speed which is a small fraction of the collecting speed, as the packet advances onto a sheet stacking platform.

3. The method of inspecting, cutting, sorting and delivering sheets of paper which comprises, in combination, advancing at constant speed a single web of paper past an inspection station, scanning each sheet length of the web as it passes the inspection station to determine the quality thereof while developing classification signals characteristic of any significant defects, advancing the web to a sheet cutting station, cutting successive sheets of predetermined, uniform length from the leading end of the web at the cutting station, increasing the speed of each cut sheet to a predetermined collecting speed, continuing the advance of the sheets at the collecting speed along a path which includes a plurality of sorting and collecting stations, separating the sheets of first quality at one sorting and collecting station under the control of the classification signals, separating the sheets of second quality at another sorting and collecting station under the control of the classification signals, at each sorting and collecting station collecting the separated sheets in a registered packet until a packet composed of a predetermined number of sheets has been accumulated, then delivering each packet from each sorting and collecting station at undiminished speed for at least a packet length to sheet receiving and stacking tables associated with the respective sorting and collecting stations, smoothly and progressively slowing down each packet as each packet advances across a sheet receiving and stacking table, and discharging each packet to a sheet receiving and stacking table at a speed which is a small fraction of the collecting speed.

4. The method of inspecting, cutting, sorting and delivering sheets of paper which comprises, in combination, advancing a single web of paper at constant speed successively past an inspection station and a sheet cutting station, scanning each sheet length of the web as it passes the inspection station to determine the quality thereof while developing classification signals characteristic of any significant defects, cutting successive sheets of predetermined, uniform length from the leading end of the traveling web at the cutting station, continuing the advance of the sheets at undiminished speed along a path which includes a plurality of sorting stations, separating the sheets of first quality at one sorting station, separating the sheets of second quality at another sorting station, conveying the separated sheets at high velocity away from each sorting station to sheet stacking tables associated with the respective sorting stations, smoothly and progressively slowing down the separated sheets to a relatively low velocity as the sheets advance across the sheet stacking tables, stacking the separated sheets that are conveyed to each sheet stacking table, and conveying the sheets not separated at either sorting station to a reject collecting station.

5. The method of inspecting, cutting, sorting and delivering sheets of paper which comprises, in combination, advancing at constant speed a single web of paper past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a plurality of associated sorting stations and collecting stations, sorting out the sheets of first quality at one sorting station under the control of the classification signals and collecting the first quality sheets in a registered packet until a packet composed of a predetermined number of sheets has been accumulated, sorting out the sheets of second quality at another sorting station under the control of the classification signals and collecting the second quality sheets in registered packets, each packet composed of a predetermined number of sheets, conveying each sheet packet when accumulated away from each collecting station at undiminished speed for at least a packet length and thereafter progressively slowing down each sheet packet and continuing the progressive slowing down of each sheet as each packet advances across a sheet stacking table, discharging each sheet packet at a sheet stacking table at a final delivery speed which is only a small fraction of the collecting speed, and conveying the sheets not sorted out at the sorting stations to a reject collecting station.

6. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, increasing the speed of each cut sheet to a predetermined collecting speed, continuing the advance of the sheets at the collecting speed along a path which includes a plurality of sorting and collecting stations, separating the sheets of first quality at one sorting and collecting station under the control of the classification signals, separating the sheets of second quality at another sorting and collecting station under the control of the classification signals, at each sorting and collecting station collecting the separated sheets in registered packets, each packet composed of a predetermined number of sheets, conveying each sheet packet at high velocity away from each sorting and collecting station to sheet stacking tables associated with the respective sorting and collecting stations, positively gripping each sheet packet at its trailing end and progressively slowing down each sheet packet, as the packet advances across a sheet stacking table, and discharging each sheet packet at a sheet stacking table at a final delivery speed which is only a small fraction of the collecting speed.

7. The method of inspecting, cutting, sorting and delivering sheets of paper which comprises, in combination, advancing a single web of paper at constant speed successively past an inspection station and a sheet cutting station, scanning each sheet length of the web as it passes the inspection station to determine the quality thereof while developing classification signals characteristic of significant defects, cutting successive sheets of predetermined, uniform length from the leading end of the traveling web at the cutting station, continuing the advance of the sheets at undiminished speed along a path which includes a sorting station, separating the sheets of an acceptable category at the sorting station, conveying the separated sheets at high velocity away from the sorting station to a table for stacking paper, smoothly and progressively slowing down the separated sheets to a relatively low velocity as the sheets advance across the table, and conveying the unacceptable sheets to a reject collecting station.

8. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a sorting station, separating the sheets of an acceptable category at the sorting station and collecting the separated sheets in registered packets, each packet composed of a predetermined number of sheets, conveying each sheet packet at high velocity away from the sorting station to a sheet receiving and stacking table, positively gripping each sheet packet at its trailing end and progressively slowing down each sheet packet, as the packet advances onto the sheet receiving and stacking table, discharging each sheet packet to the sheet receiving and stacking table at a final delivery speed which is only a small fraction of the collecting speed, and conveying the unacceptable sheets to a reject collecting station.

9. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a sorting station, sorting out the sheets of less than first quality at the sorting station, continuing the advance of the sheets of first quality to a collecting station, collecting the first quality sheets at the collecting station, conveying the collected sheets at high velocity from the collecting station to a table for stacking paper, and smoothly and progressively slowing down the collected sheets to a relatively low velocity as the sheets advance across the table.

10. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a sorting station, sorting out the sheets of less than first quality at the sorting station, continuing the advance of the sheets of first quality to a collecting station, collecting the first quality sheets at the collecting station in registered packets, each packet composed of a number of sheets up to a predetermined maximum number of sheets, conveying each sheet packet when accumulated away from the collecting station at high velocity to a sheet stacking table positively gripping each sheet packet at its trailing end and progressively slowing down each sheet packet to a relatively low velocity, as the packet advances across the sheet stacking table, and discharging each sheet packet to the sheet stacking table at a final delivery speed which is only a small fraction of the collecting speed.

11. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a sorting station, sorting out the sheets of less than first quality at the sorting station, continuing the advance of the sheets of first quality to a collecting station, collecting the first quality sheets at the collecting station in registered packets, conveying each sheet packet when accumulated away from each collecting station at undiminished speed for at least a packet length and thereafter progressively slowing down each sheet packet and continuing the progressive slowing down of each sheet packet as each packet advances onto and across a sheet receiving and stacking table, and discharging each sheet packet to the sheet receiving and stacking table at a final delivery speed which is only a small fraction of the collecting speed.

12. The method of inspecting, cutting, sorting and delivering sheets of paper which comprises, in combination, advancing a single web of paper at constant speed successively past an inspection station and a sheet cutting station, scanning each sheet length of the web as it passes the inspection station to determine the quality thereof while developing classification signals characteristic of significant defects, cutting successive sheets of predetermined, uniform length from the leading end of the traveling web at the cutting station, continuing the advance of the sheets at undiminished speed along a path which includes a sorting station, separating the sheets of an acceptable category at the sorting station under the control of the classification signals, conveying the separated sheets from the sorting station to a sheet stacking table, simultaneously delivering the separated sheets onto the sheet stacking table and slowing down the separated sheets as they advance across the table, and conveying the unacceptable sheets to a reject collecting station.

13. The method of inspecting, cutting, sorting and delivering sheets of paper which comprises, in combination, advancing a single web of paper at constant speed past an inspection station, scanning each sheet length of the web as it passes the inspection station to determine the quality thereof while developing classification signals characteristic of significant defects, advancing the web to a sheet cutting station, cutting successive sheets of predetermined, uniform length from the leading end of the traveling web at the cutting station, advancing the sheets at undiminished speed along a path which includes a sorting station, sorting out the sheets of less than first quality at the sorting station under the control of the classification signals, continuing the advance of the sheets of first quality to a collecting station, collecting the first quality sheets at the collecting station, conveying the collected sheets from the collecting station to a sheet stacking table, and simultaneously delivering the collected sheets onto the sheet stacking table and slowing down the collected sheets as they advance across the table.

References Cited by the Examiner

UNITED STATES PATENTS

| | | | |
|---|---|---|---|
| 1,450,573 | 4/1923 | Barber | 270—60 |
| 1,624,985 | 4/1927 | Sheldon | 270—60 |
| 1,691,891 | 11/1928 | Meisel | 270—60 |
| 2,291,754 | 8/1942 | Piazze | 83—106 X |
| 2,620,033 | 12/1952 | Wood | 83—110 |
| 2,855,996 | 10/1958 | Stobb | 83—156 X |
| 3,169,428 | 2/1965 | Owen | 83—106 X |

WILLIAM W. DYER, Jr., *Primary Examiner.*

F. T. YOST, *Assistant Examiner.*

UNITED STATES PATENT OFFICE
CERTIFICATE OF CORRECTION

Patent No. 3,222,964 December 14, 1965

David Noel Obenshain

It is hereby certified that error appears in the above numbered patent requiring correction and that the said Letters Patent should read as corrected below.

Column 2, line 57, for "principall" read -- principally --; column 32, lines 18 and 19, for "defiective" read -- defective --; column 35, line 65, strike out "ing down of each sheet as each packet advances across" and insert instead -- ing down of each sheet packet as each packet advances across --; column 37, line 31, after "table" insert a comma.

Signed and sealed this 4th day of October 1966.

(SEAL)
Attest:

ERNEST W. SWIDER
Attesting Officer

EDWARD J. BRENNER
Commissioner of Patents